United States Patent
Panzer et al.

(10) Patent No.: US 12,372,642 B2
(45) Date of Patent: Jul. 29, 2025

(54) APPARATUS, SYSTEM AND METHOD OF A RADAR ANTENNA

(71) Applicant: Intel Corporation, Santa Clara, CA (US)

(72) Inventors: Adi Panzer, Tel Aviv (IL); Ofer Markish, Ra'anana (IL); Moshe Teplitsky, Tel-Aviv (IL); Arnaud Amadjikpe, Beaverton, OR (US); Tae Young Yang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 735 days.

(21) Appl. No.: 17/446,070

(22) Filed: Aug. 26, 2021

(65) Prior Publication Data

US 2021/0389453 A1    Dec. 16, 2021

(51) Int. Cl.
*G01S 13/931* (2020.01)
*G01S 7/03* (2006.01)
(Continued)

(52) U.S. Cl.
CPC .............. *G01S 13/931* (2013.01); *G01S 7/03* (2013.01); *H01Q 1/3233* (2013.01);
(Continued)

(58) Field of Classification Search
CPC .......... G01S 13/931; G01S 7/03; G01S 7/356; G01S 13/343; G01S 2013/93271;
(Continued)

(56) References Cited

U.S. PATENT DOCUMENTS

2010/0188304 A1* 7/2010 Clymer ............... H01Q 19/062
343/756
2016/0116582 A1  4/2016 Chang
(Continued)

FOREIGN PATENT DOCUMENTS

CN          106961404 A  *  7/2017
WO   WO-2020189114 A1  *  9/2020  ............. G01S 13/42
(Continued)

OTHER PUBLICATIONS

"Vayyar unveils mmWave 3D imaging SoC evaluation kit", Posted on Dec. 12, 2018 by Gina Roos, Electronic Products, https://www.electronicproducts.com/vayyar-unveils-mmwave-3d-imaging-soc-evaluation-kit/#, retrieved Jul. 2, 2021, 4 pages.
(Continued)

*Primary Examiner* — Timothy A Brainard
*Assistant Examiner* — Ismaaeel A. Siddiquee
(74) *Attorney, Agent, or Firm* — Shichrur & Co.

(57) ABSTRACT

For example, a radar antenna may include a Transmit (Tx) antenna array configured to transmit a plurality of Tx radar signals; and a Receive (Rx) antenna array configured to receive a plurality of Rx radar signals based on the plurality of Tx radar signals, the Rx antenna array is orthogonal to the Tx antenna array, wherein a first array of the Tx antenna array or the Rx antenna array includes a first sub-array and a second sub-array parallel to the first sub-array, wherein a sub-array spacing between the first sub-array and the second sub-array is shorter than a length of a second array of the Tx antenna array or the Rx antenna array.

23 Claims, 21 Drawing Sheets

(51) Int. Cl.
*H01Q 1/32* (2006.01)
*H01Q 21/06* (2006.01)
*G01S 7/35* (2006.01)
*G01S 13/34* (2006.01)
*G01S 13/88* (2006.01)

(52) U.S. Cl.
CPC ............ *H01Q 21/061* (2013.01); *G01S 7/356* (2021.05); *G01S 13/343* (2013.01); *G01S 13/881* (2013.01); *G01S 2013/93271* (2020.01); *H01Q 21/06* (2013.01)

(58) Field of Classification Search
CPC .. G01S 13/881; H01Q 1/3233; H01Q 21/061; H01Q 21/06
See application file for complete search history.

(56) References Cited

U.S. PATENT DOCUMENTS

| | | | |
|---|---|---|---|
| 2018/0246203 A1* | 8/2018 | Lee | G01S 7/032 |
| 2020/0182991 A1* | 6/2020 | Hakobyan | H04B 7/0413 |
| 2020/0225317 A1* | 7/2020 | Chen | G01S 7/417 |
| 2020/0259268 A1* | 8/2020 | Iluz | H01Q 21/08 |
| 2022/0163623 A1* | 5/2022 | Kishigami | G01S 13/42 |
| 2022/0268911 A1* | 8/2022 | Wu | G01S 7/41 |
| 2024/0283145 A1* | 8/2024 | Winkler | H01Q 21/065 |

FOREIGN PATENT DOCUMENTS

| | | |
|---|---|---|
| WO | 2021/012150 | 1/2021 |
| WO | 2021/137191 | 7/2021 |

OTHER PUBLICATIONS

Search Report for European Patent Application No. 22186848.2, mailed on Jan. 24, 2023, 7 pages.

* cited by examiner

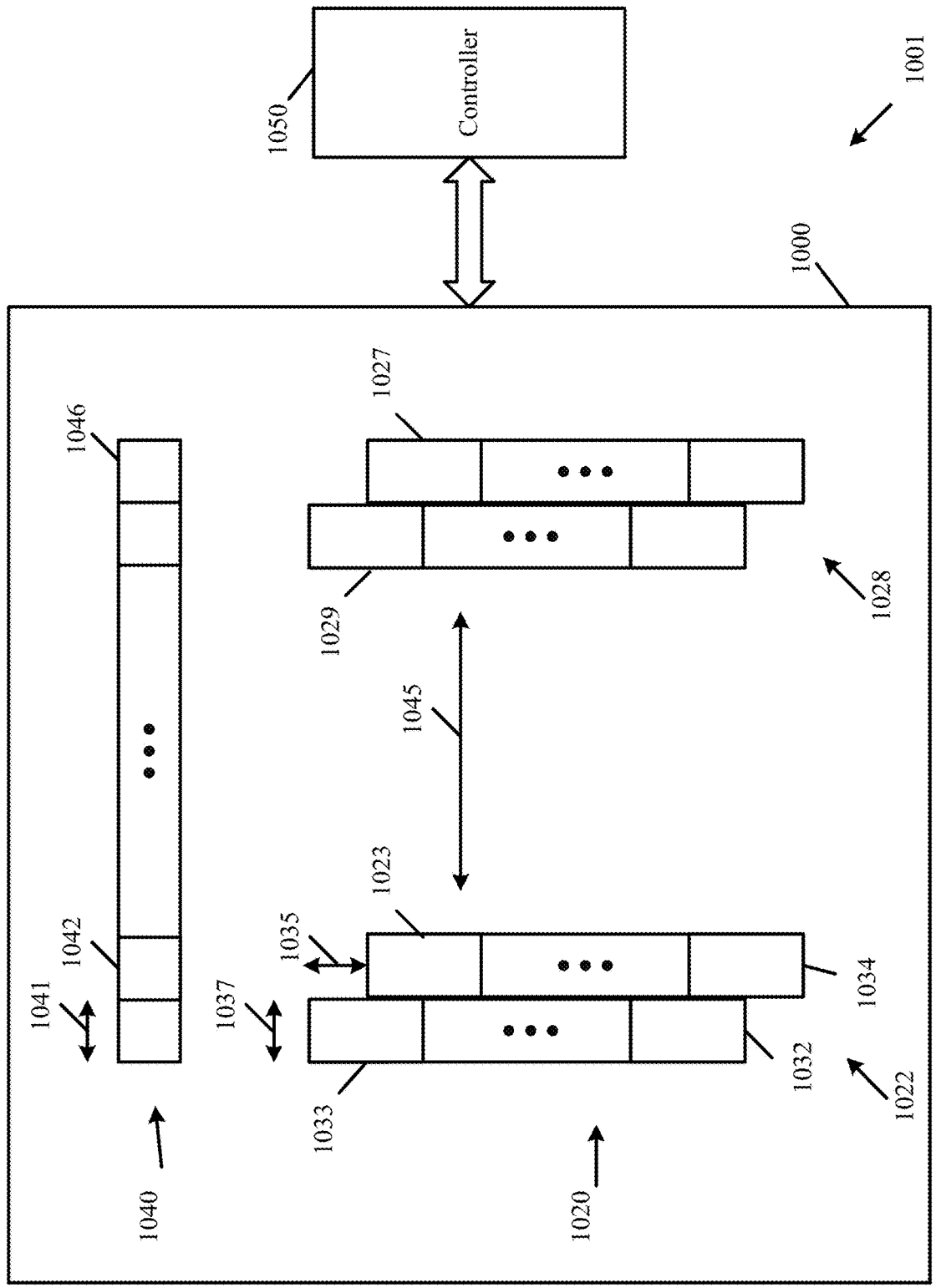

APPARATUS, SYSTEM AND METHOD OF A RADAR ANTENNA

TECHNICAL FIELD

Aspects described herein generally relate to a radar antenna.

BACKGROUND

Multiple Input Multiple Output (MIMO) radar is a technology that allows reduction of a physical array aperture and a number of antenna elements. For example, the MIMO radar utilizes transmission of orthogonal signals from a transmit (Tx) array with a plurality of elements, and processing received signals via a receive (Rx) array with a plurality of elements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 10 is a schematic illustration of an apparatus including a radar antenna, in accordance with some demonstrative aspects.

DETAILED DESCRIPTION

Figure 1:
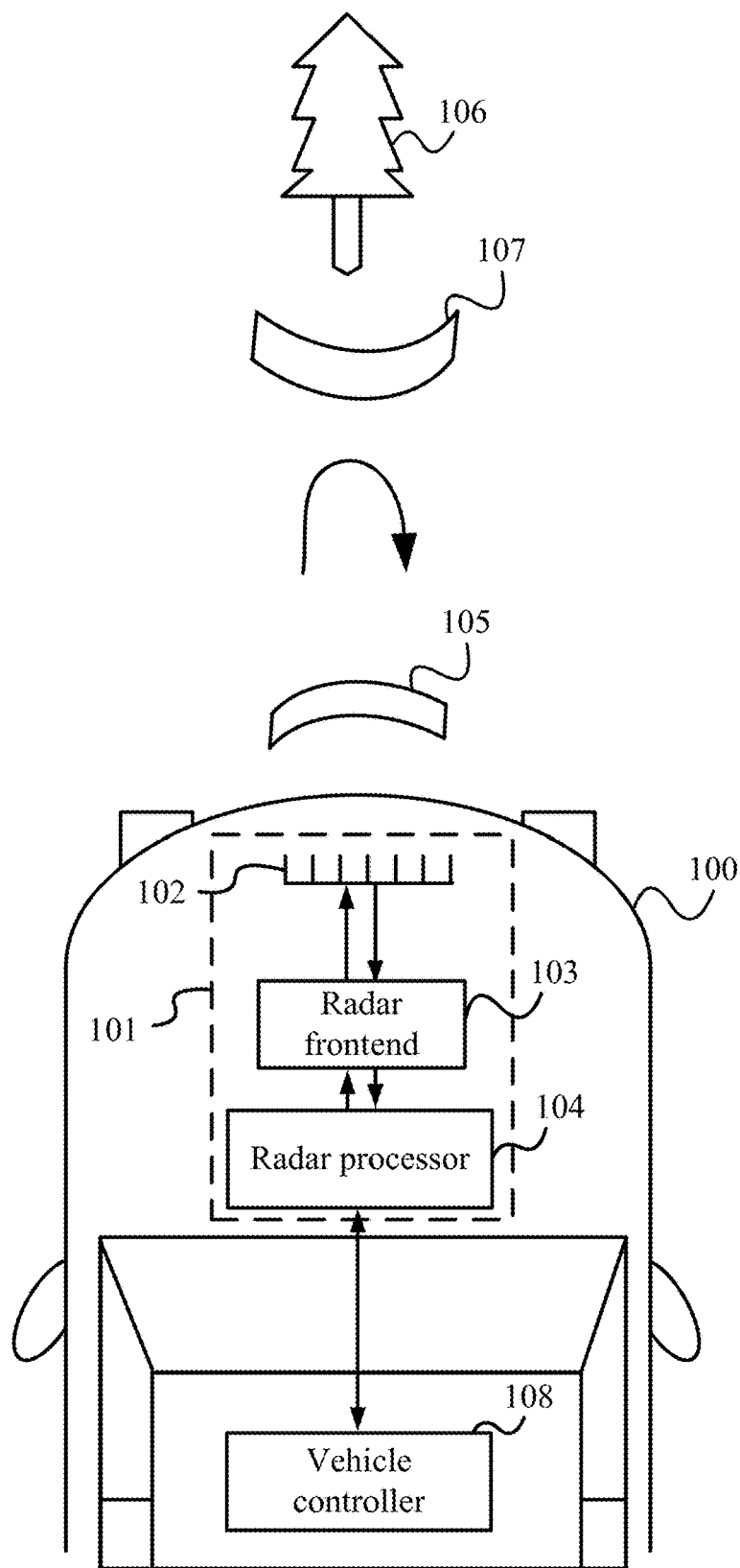
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" "one aspect", "an aspect", "demonstrative aspect", "various aspects" etc., indicate that the aspect(s) and/or aspects so described may include a particular feature, structure, or characteristic, but not every aspect or aspect necessarily includes the particular feature, structure, or characteristic. Further, repeated use of the phrase "in one aspect" or "in one aspect" does not necessarily refer to the same aspect or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in *SAE J3016 2018: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, a driver assistance and/or support system, and/or the like.

For example, radar device 101 may be installed in vehicle 101 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below. In one example, radar device 101 may be mounted onto, placed, e.g., directly, onto, or attached to, vehicle 100.

In some demonstrative aspects, vehicle 100 may include a single radar device 101. In other aspects, vehicle 100 may include a plurality of radar devices 101, for example, at a plurality of locations, e.g., around vehicle 100.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
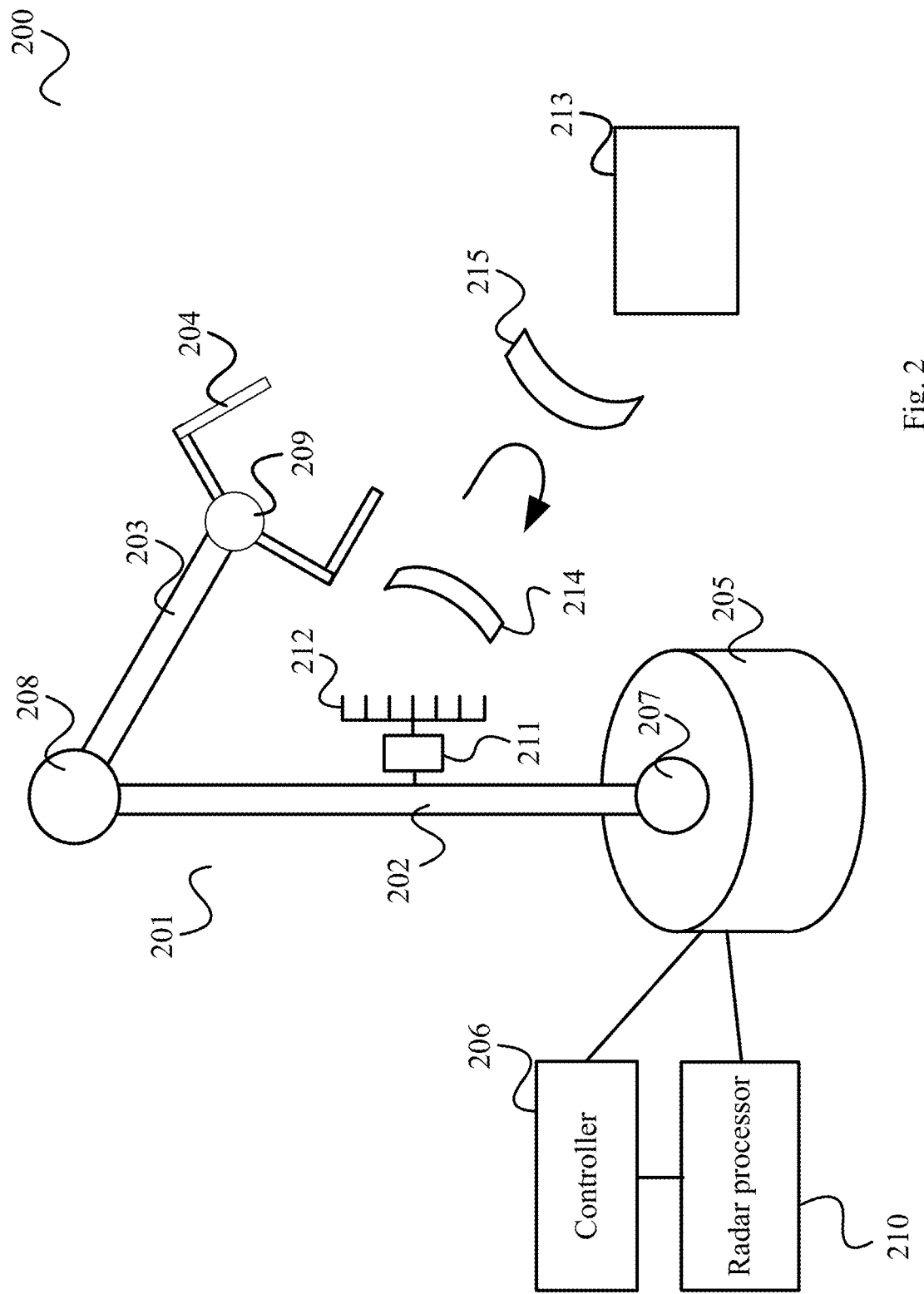
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
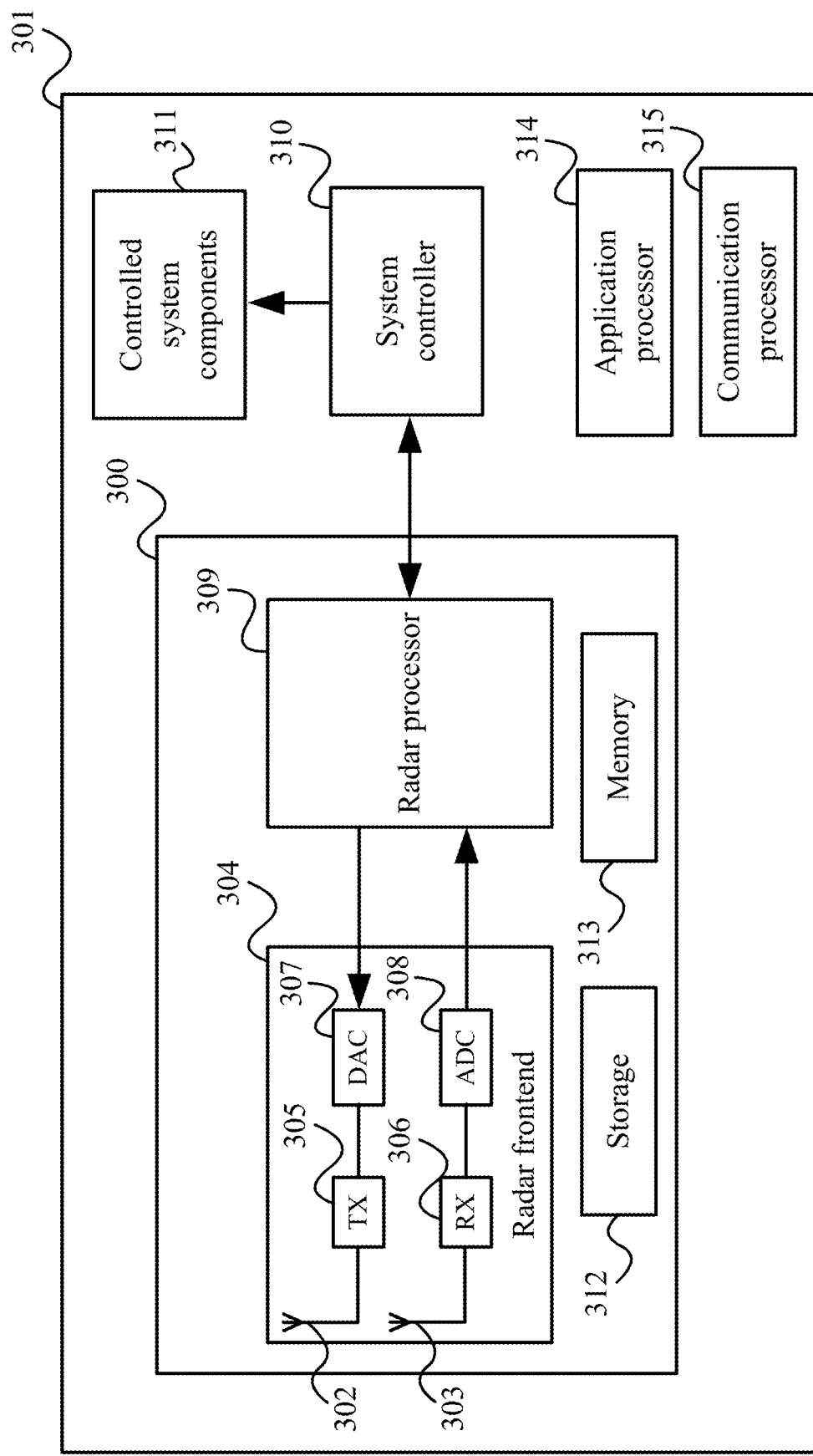
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
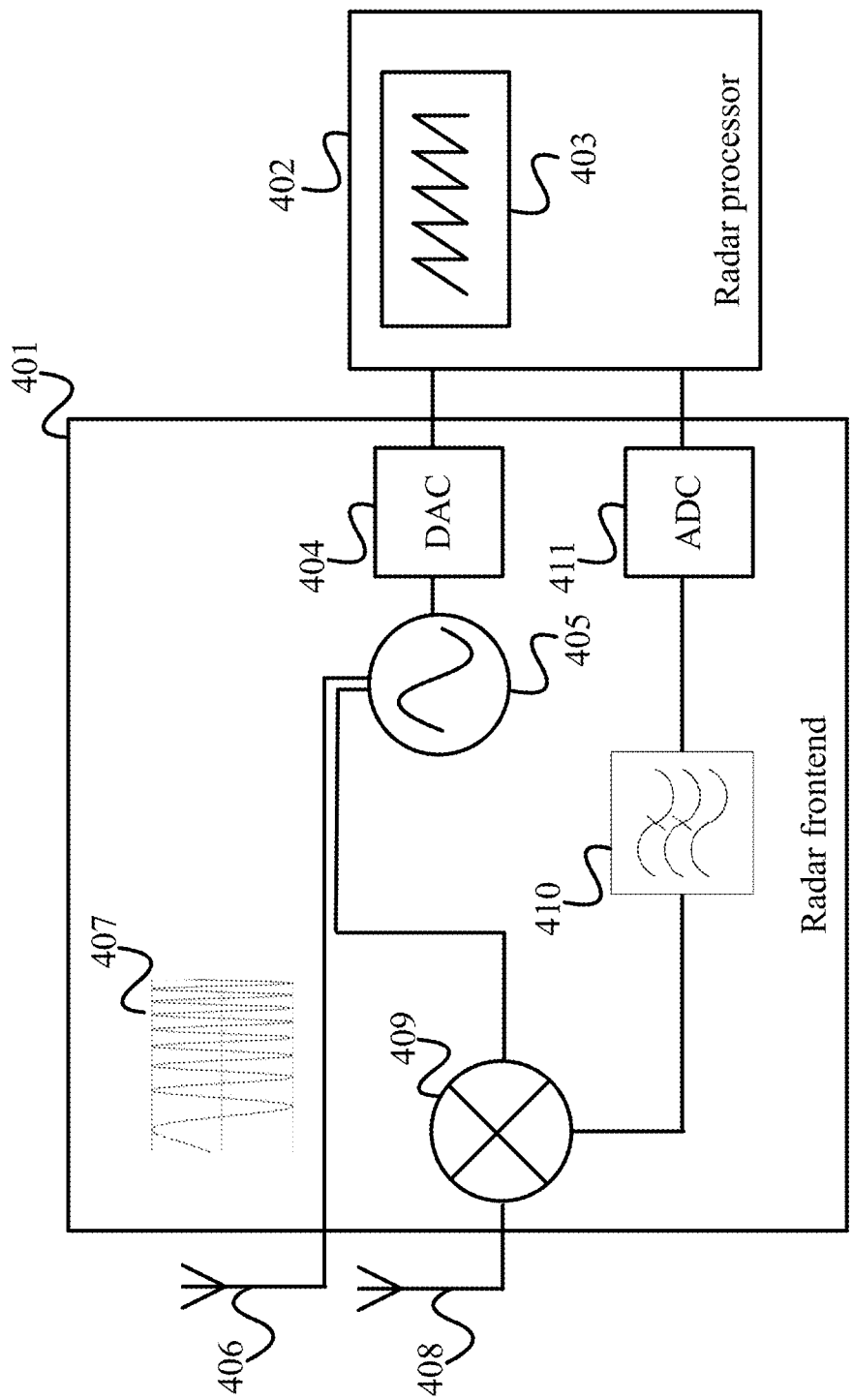
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
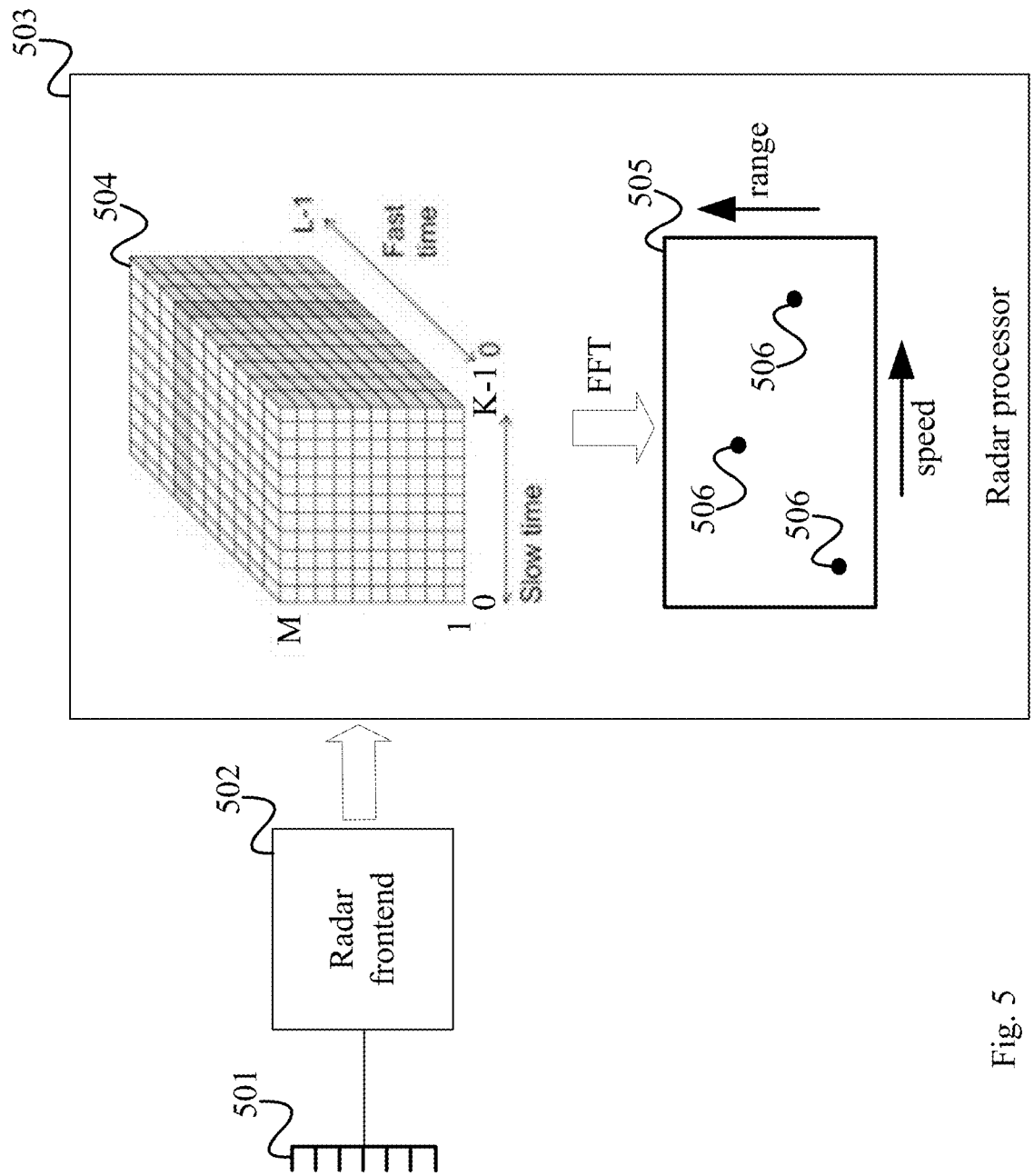
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 105 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
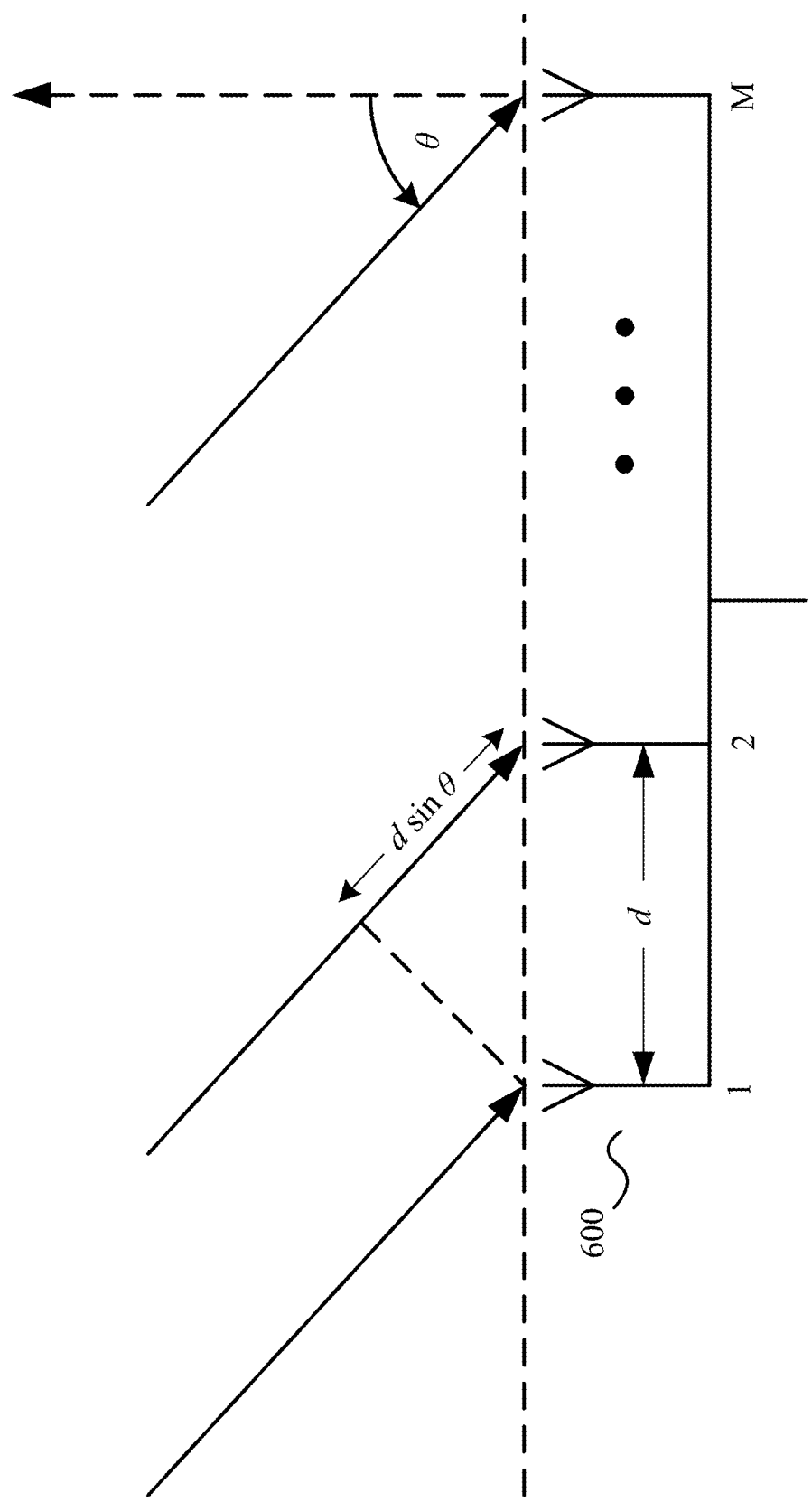
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted Δφ, between two antennas of the receive antenna array 601 may be determined, e.g., as follows:

$$\Delta\varphi = \frac{2\pi}{\lambda} \cdot d \cdot \sin(\theta)$$

wherein λ denotes a wavelength of the incoming radio signal, d denotes a distance between the two antennas, and θ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
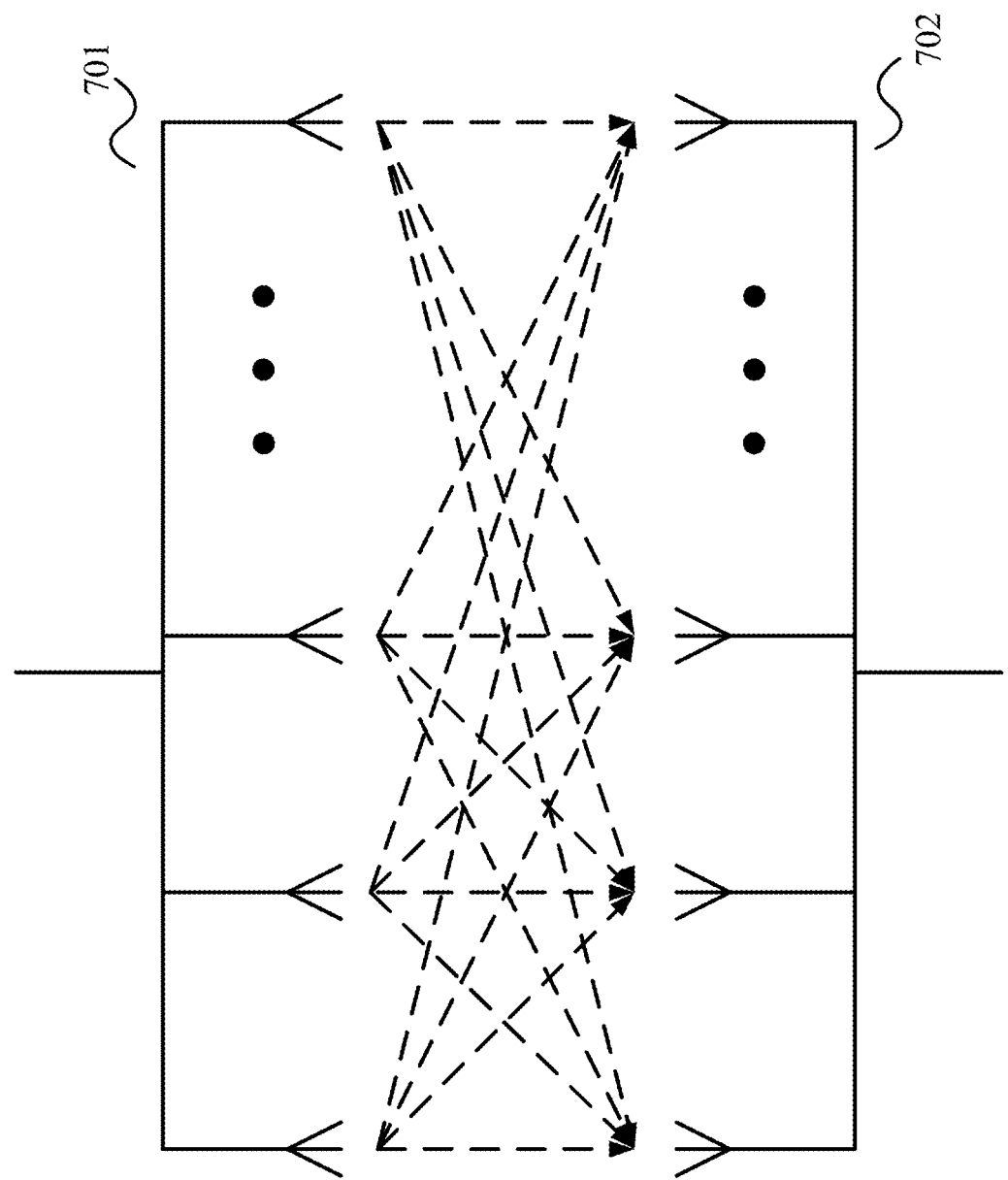
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
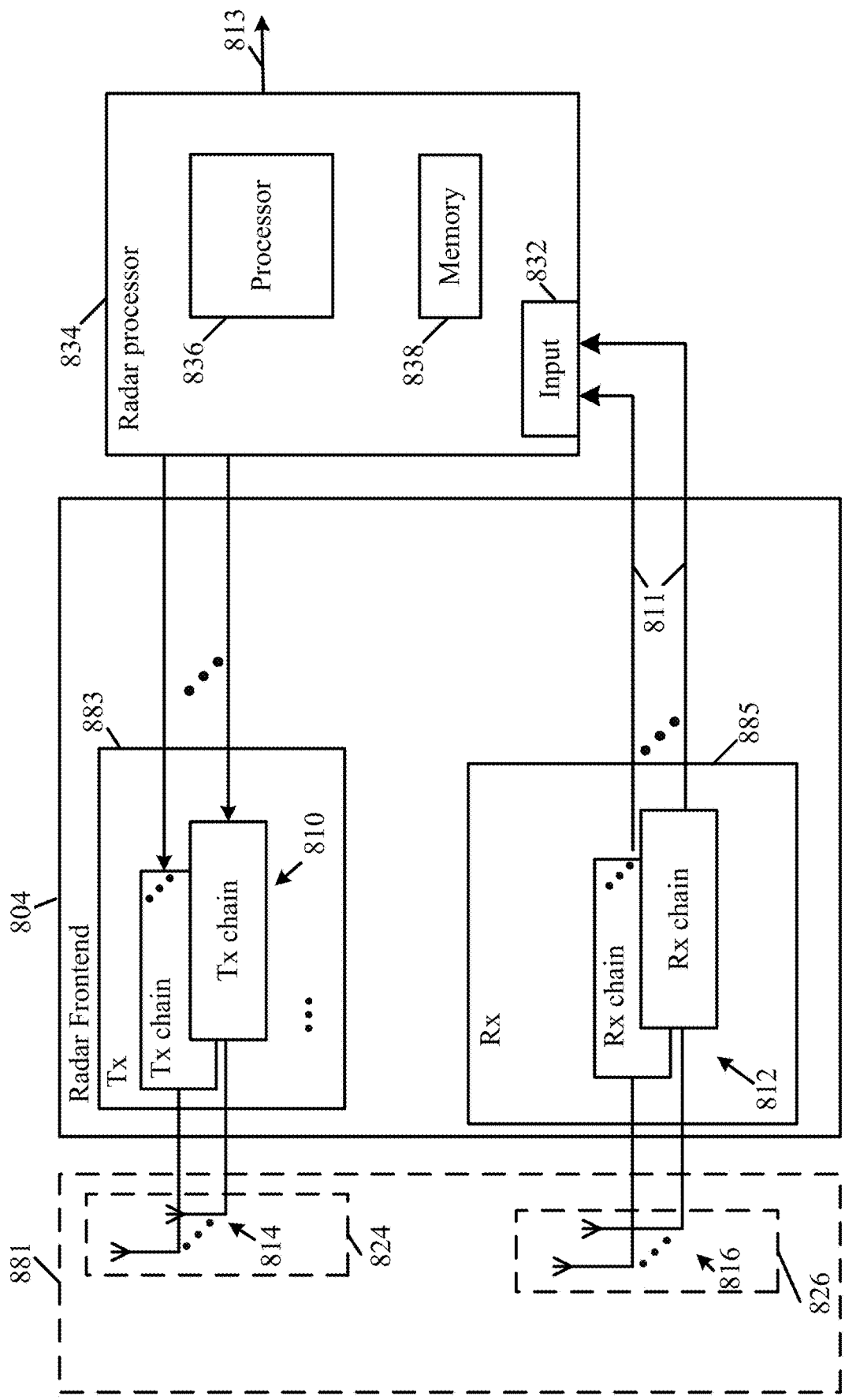
FIG. 8 is a schematic block diagram illustration of a radar frontend and a radar processor, in accordance with some demonstrative aspects.

FIG. 8 is a schematic block diagram illustration of a radar frontend 804 and a radar processor 834, in accordance with some demonstrative aspects. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data, e.g., as described below. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via a Tx array 824 including a plurality of N elements, e.g., Tx antennas 814, and processing received signals via an Rx array 826 including a plurality of M elements, e.g., Rx antennas 816.

In some demonstrative aspects, utilizing the MIMO technique of transmission of the orthogonal signals from the Tx array 824 with N elements and processing the received signals in the Rx array 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, there may be a need to provide a technical solution to efficiently and/or accurately detect locations of targets, for example, in multipath scenarios and/or environments, for example, compared to free space scenarios and/or environments, e.g., as described below.

In one example, a reflected signal of a transmitted signal may pass through interfering objects, for example, when the signal is transmitted towards a desired target direction in a multipath environment. According to this example, received Rx signals from the interfering objects may arrive from various directions, which may cause false Angle of Arrival (AoA) estimations.

For example, a signal transmitted towards a desired target direction may return to a radar antenna from multiple angles, for example, due to reflections from guardrails, buildings, vehicles, and/or other interfering objects.

In some demonstrative aspects, the Rx array 826 including Rx antennas 816 may be orthogonal to the Tx array 824 including Tx antennas 814, e.g., as described below.

In some demonstrative aspects, there may be a need to address one or more technical issues, for example, when implementing an Rx array orthogonal to a Tx array having an array spacing, which may be equal to half a wavelength of the plurality of Tx radar signals (also referred to as a "half-wavelength/($\lambda$/2) spacing array"), e.g., as described below.

In one example, since beam patterns of $\lambda$/2 spacing arrays may not contain grating lobes, e.g., parasitic main lobes in various angles, a radar antenna may be able to attenuate, e.g., to some extent, Rx signals arriving from interfering paths.

Figure 9:
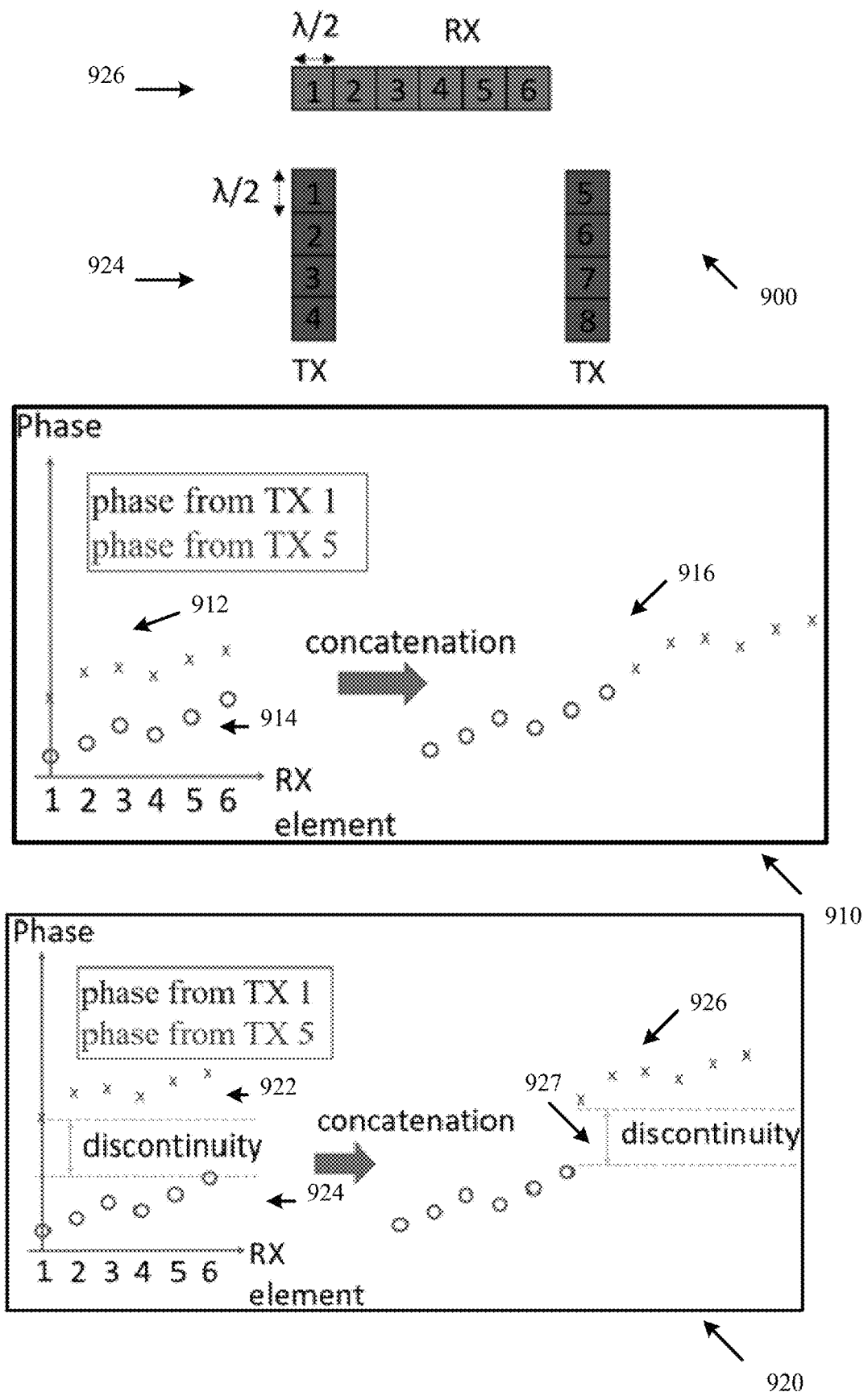
FIG. 9 is a schematic illustration of an arrangement of an antenna array, a first graph depicting first phases of first Rx radar signals received via the antenna array, and a second graph depicting second phases of second Rx radar signals received via the antenna array, to demonstrate a technical problem, which may be addressed in accordance with some demonstrative aspects.

Reference is made to FIG. 9, which schematically illustrates an arrangement of an antenna array 900, a first graph 910 depicting first phases of first Rx radar signals received via antenna array 900, and a second graph 920 depicting second phases of second Rx radar signals received via antenna array 900, to demonstrate a technical problem, which may be addressed in accordance with some demonstrative aspects.

As shown in FIG. 9, antenna array 900 may include a Tx array 924 and an Rx array 926 orthogonal to the Tx array 924.

As shown in FIG. 9, Tx array 924 may be configured according to the half-wavelength array spacing, and/or the Rx array 926 may be configured according to the half-wavelength array spacing.

As shown in FIG. 9, graph 910 depicts first and second phases of Rx signals received via Rx array 926, for example, based on transmissions from a Tx pair of antenna elements of Tx array 924, for example, towards targets in a free space environment.

As shown in FIG. 9, graph 910 depicts first phases 912 of first Rx signals received via Rx array 926, for example, based on a first Tx signal transmitted from a Tx antenna element, denoted Tx5, of Tx array 924.

As shown in FIG. 9, graph 910 depicts second phases 914 of second Rx signals received via Rx array 926, for example, based on a second Tx signal transmitted from another Tx antenna element, denoted Tx1, of Tx array 924.

In one example, similar behavior of phases may be simulated, for example, with respect to other pairs of Tx antenna elements of Tx array 924, e.g., Tx pairs (Tx2, Tx6), (Tx3, Tx7), and/or (Tx4, Tx8), e.g., in the free space environment.

As shown in FIG. 9, graph 910 depicts a concatenation 916 of phases 912 and 914.

As shown in FIG. 9, concatenation 916 may result in a single curve, for example, from which directions of targets may be estimated, e.g., accurately.

As shown in FIG. 9, graph 920 depicts first and second phases of Rx signals received via Rx array 926, for example, based on transmissions from a Tx pair of antenna elements of Tx array 924, for example, towards targets in a multipath environment.

As shown in FIG. 9, graph 920 depicts first phases 922 of first Rx signals received via Rx array 926, for example, based on a first Tx signal transmitted from the Tx antenna element Tx5 of Tx array 924.

As shown in FIG. 9, graph 920 depicts second phases 924 of second Rx signals received via Rx array 926, for example, based on a second Tx signal transmitted from the Tx antenna element Tx1 of Tx array 924.

In one example, similar behavior of phases may be simulated, for example, with respect to other pairs of Tx antenna elements of Tx array 924, e.g., Tx pairs (Tx2, Tx6), (Tx3, Tx7), and (Tx4, Tx8), e.g., in the multipath environment.

As shown in FIG. 9, graph 920 depicts a concatenation 926 of phases 922 and 924.

As shown in FIG. 9, concatenation 926 may not include a single continuous curve.

As shown in FIG. 9, a phase discontinuity 927 may be created in concatenation 926, for example, due to a large distance between Tx antenna element Tx1 and Tx antenna element Tx5, and/or due to arrival of energy from false path angles. Accordingly, after concatenating the phases 922 and 924, a single curve may not be formed and, therefore, one or more errors in an AoA estimation may occur.

In one example, an array topology of antenna array 900 may be sensitive to reflections from a road, for example, in addition to phase discontinuities, e.g., phase discontinuity 927. For example, antenna array 900 may transmit a large amount of energy towards the road, which may lead to undesired reflections and false alarms along an elevation dimension. For example, the large amount of energy may be transmitted towards the road, for example, a relatively small distance between Tx elements inside each Tx column of Tx array 924 may result in a small antenna with a wide beam.

In some demonstrative aspects, there may be a need to provide a technical solution, for example, to mitigate or eliminate multi-path effects, which may cause the phase discontinuities when concatenating phases of the Rx signals, e.g., as described below.

In some demonstrative aspects, radar antenna 881 (FIG. 8) may include an array topology and/or an arrangement, which may be configured to reduce, e.g., dramatically reduce and/or mitigate, the multipath effects.

Reference is made to FIG. 10, which schematically illustrates an apparatus 1001 including a radar antenna 1000, in accordance with some demonstrative aspects. For example, apparatus 1001 may include one or more elements of radar front-end 804 (FIG. 8), and/or may perform one or more operations and/or functionalities of radar front-end 804 (FIG. 8). For example, MIMO radar antenna 881 (FIG. 8) may include one or more elements of radar antenna 1000, and/or may perform one or more operations and/or functionalities of radar antenna 1000.

In some demonstrative aspects, as shown in FIG. 10, radar antenna 1000 may include a Tx antenna array 1020 and an Rx antenna array 1040, e.g., as described below. For example, Tx array 824 (FIG. 8) may include one or more elements of Tx antenna array 1020, and/or may perform one or more operations and/or functionalities of Tx antenna array 1020; and/or Rx array 826 (FIG. 8) may include one or more elements of Rx antenna array 1040, and/or may perform one or more operations and/or functionalities of Rx antenna array 1040.

In some demonstrative aspects, the Tx antenna array 1020 may be configured to transmit a plurality of Tx radar signals, e.g., as described below.

In some demonstrative aspects, the Rx antenna array 1040 may be configured to receive a plurality of Rx radar signals, for example, based on the plurality of Tx radar signals, e.g., as described below.

In some demonstrative aspects, as shown in FIG. 10, the Rx antenna array 1040 may be orthogonal to the Tx antenna array 1020, e.g., as described below.

In some demonstrative aspects, as shown in FIG. 10, a first array of the Tx antenna array 1020 or the Rx antenna array 1040, e.g., Tx antenna array 1020, may include a first sub-array 1022 and a second sub-array 1028 parallel to the first sub-array 1022, e.g., as described below.

In some demonstrative aspects, a sub-array spacing 1045 between the first sub-array 1022 and the second sub-array 1028 may be shorter than a length of a second array of the Tx antenna array 1020 or the Rx antenna array 1040, e.g., a length of Rx antenna array 1040, e.g., as described below.

In one example, the sub-array spacing 1045 may maintain an array overlap between antenna elements of the Rx antenna array 1040 and antenna elements of sub-arrays 1022 and/or 1028, e.g., as described below.

In some aspects, the first array may include the Tx antenna array 1020, and the second array may include the Rx antenna array 1040, e.g., as shown in FIG. 10, and described below.

In other aspects, the first array may include the Rx antenna array 1040, and the second array may include the Tx antenna array 1020.

In some demonstrative aspects, as shown in FIG. 10, the second array, e.g., Rx antenna array 1040, may include a 1D array including a plurality of antenna elements having a same length along an axis parallel to the second array, e.g., as described below.

In some demonstrative aspects, as shown in FIG. 10, a distance between a center of a first antenna element of the second array, e.g., Rx antenna array 1040, and a center of a second antenna element of the second array, which may be adjacent to the first antenna element, may be equal to half the wavelength of the plurality of Tx radar signals, e.g., as described below.

In some demonstrative aspects, as shown in FIG. 10, a length 1041 of an antenna element 1042 of the second array, e.g., Rx antenna array 1040, along an axis parallel to the second array may be equal to half a wavelength of the plurality of Tx radar signals, e.g., as described below.

In some demonstrative aspects, as shown in FIG. 10, the first sub-array 1022 may be identical to the second sub-array 1028, e.g., as described below.

In some demonstrative aspects, as shown in FIG. 10, the first sub-array 1022 may include a first plurality of 1D arrays, and/or the second sub-array 1028 may include a second plurality of 1D arrays, e.g., as described below.

In some demonstrative aspects, as shown in FIG. 10, the second array, e.g., the Rx array 1040, may include a third plurality of antenna elements, e.g., as described below.

In some demonstrative aspects, as shown in FIG. 10, centers of the plurality of 1D arrays may be aligned with centers of respective antenna elements of the third plurality of antenna elements of the second array, e.g., as described below. For example, centers of the first plurality of 1D arrays of the first sub-array 1022 may be aligned with centers of first respective antenna elements of the Rx array 1040, and/or centers of the second plurality of 1D arrays of the second sub-array 1028 may be aligned with centers of second respective antenna elements of the Rx array 1040.

In some demonstrative aspects, as shown in FIG. 10, a first distance between an antenna element of the first sub-array 1022, e.g., an antenna element 1023, and a first antenna element of the second array 1028, e.g., antenna element 1042, may be equal to a second distance between an antenna element of the second sub-array, e.g., an antenna element 1027, and a second antenna element of the second array, e.g., an antenna element 1046, e.g., as described below.

In some demonstrative aspects, as shown in FIG. 10, the first antenna element of the second array, may be above the antenna element of the second sub-array 2028, and/or the second antenna element of the second array may be above the antenna element of the first sub-array 1022. For example, antenna element 1042 may be above antenna element 1023, and/or antenna element 1046 may be above antenna element 1027.

In some demonstrative aspects, as shown in FIG. 10, first sub-array 1022 and/or the second sub-array 1028 may include a staggered arrangement of a plurality 1D arrays, e.g., as described below. For example, first sub-array 1022 may include a staggered arrangement of the first plurality 1D arrays; and/or second sub-array 1028 may include a staggered arrangement of the second plurality 1D arrays.

In some demonstrative aspects, as shown in FIG. 10, the first plurality of 1D arrays may include a first 1D array 1032 including a first plurality of antenna elements, and a second 1D array 1034 including a second plurality of antenna elements staggered relative to the first plurality of antenna elements, e.g., as described below.

In some demonstrative aspects, as shown in FIG. 10, a 1D-array-spacing 1035 between a beginning of the first 1D array 1032 and a beginning of the second 1D array 1034 may be shorter than a length of an antenna element, e.g., an antenna element 1033, of the first 1D array 1032, e.g., as described below.

In some demonstrative aspects, as shown in FIG. 10, the 1D-array-spacing 1035 between the beginning of the first 1D array 1032 and the beginning of the second 1D array 1034 may be half of the length of the antenna element 1033, e.g., as described below.

In some demonstrative aspects, as shown in FIG. 10, the length of the antenna element 1033 may be equal to the wavelength, e.g., $\lambda$, of the plurality of Tx radar signals; and/or the 1D-array-spacing 1035 between the beginning of the first 1D array 1032 and the beginning of the second 1D array 1034 may be equal to half of the wavelength, e.g., $\lambda/2$, of the plurality of Tx radar signals, as described below.

In some demonstrative aspects, as shown in FIG. 10, the 1D-array-spacing 1035 and the length of the antenna element 1033 may be defined, for example, along an axis parallel to the first 1D array 1032, e.g., as described below.

In some demonstrative aspects, as shown in FIG. 10, a width 1037 of an antenna element of the first 1D array 1032, e.g., antenna element 1033, may be equal to the length 1041 of an antenna element of the second array 1040, e.g., as described below.

In some demonstrative aspects, as shown in FIG. 10, the width 1037 of the antenna element of the first 1D array 1032, e.g., antenna element 1033, may be equal to half the wavelength, e.g., $\lambda/2$, of the plurality of Tx radar signals; and/or the length 1041 of the antenna element of the second array 1040 may be equal to half the wavelength e.g., $\lambda/2$, of the plurality of Tx radar signals, e.g., as described below.

In some demonstrative aspects, as shown in FIG. 10, the width 1037 of the antenna element of the first 1D array 1032 and the length 1041 of the antenna element of the second array 1040 may be defined, for example, along an axis parallel to the second array 1040, e.g., as described below.

In some demonstrative aspects, as shown in FIG. 10, a distance between a center of a first antenna element of the first 1D array 1032 and a center of a second antenna element of the first 1D array 1032, which is adjacent to the first antenna element, may be not greater than the wavelength, e.g., $\lambda$, of the plurality of Tx radar signals, e.g., as described below.

In some demonstrative aspects, apparatus 1001 may include a controller 1050 configured to control the radar antenna 1000 to transmit the plurality of Tx radar signals. For example, radar processor 834 (FIG. 8) may include one or more elements of radar controller 1050, and/or may perform one or more operations and/or functionalities of radar controller 1050.

In some demonstrative aspects, controller 1050 may be configured to control the Tx antenna array 1020 to transmit a sequence of Tx radar signals, e.g., as described below.

In some demonstrative aspects, the sequence of Tx radar signals may include a first Tx radar signal via a first antenna element of the first sub-array 1022, e.g., via antenna element 1023; and a second Tx radar signal via a second antenna element of the second sub-array 1028, for example, via antenna element 1027, e.g., as described below.

In some demonstrative aspects, the second Tx radar signal may be consecutive to the first Tx radar signal in the sequence of Tx radar signals, e.g., as described below.

In some demonstrative aspects, the sequence of Tx radar signals may include a third Tx radar signal via a third antenna element of the first sub-array 1022, e.g., via antenna element 1033, and a fourth Tx radar signal via a fourth antenna element of the second sub-array 1028, for example, via an antenna element 1029, e.g., as described below.

In some demonstrative aspects, the fourth Tx radar signal may be consecutive to the third Tx radar signal in the sequence of Tx radar signals.

In some demonstrative aspects, the sequence of Tx radar signals may include a sequence of pairs of Tx radar signals, e.g., as described below.

In some demonstrative aspects, controller 1050 may be configured to control the Tx antenna array 1020 to transmit a plurality of pairs of Tx radar signals, e.g., as described below.

In some demonstrative aspects, pair of Tx radar signals may include a first Tx radar signal via a first antenna element of the first sub-array 1022, e.g., via antenna element 1023, and a second Tx radar signal via a second antenna element of the second sub-array 1028, for example, via antenna element 1027, e.g., as described below.

In some demonstrative aspects, a relative location of the first antenna element with respect to a center of the first sub-array 1022 may be identical to a relative location of the second antenna element with respect to a center of the second sub-array 1028. For example, the relative location of antenna element 1023 with respect to the center of the first sub-array 1022 may be identical to the relative location of antenna element 1027 with respect to the center of the second sub-array 1028.

In some demonstrative aspects, controller 1050 may be configured to determine one or more phase overlaps between phases of the radar Rx signals, e.g., as described below.

In some demonstrative aspects, controller 1050 may be configured to control the Tx antenna array 1020 to transmit a first Tx radar signal via a first antenna element of the first sub-array 1022, e.g., via antenna element 1023, and to transmit a second Tx radar signal via a second antenna element of the second sub-array 1028, e.g., via antenna element 1027, e.g., as described below.

In some demonstrative aspects, controller 1050 may be configured to determine a first weighted phase, for example, by applying a first weight to a phase of a first Rx radar signal based on the first Tx radar signal, e.g., as described below.

In some demonstrative aspects, controller 1050 may be configured to determine second weighted phase, for example, by applying a second weight to a phase of a second Rx radar signal based on the second Tx radar signal, e.g., as described below.

In some demonstrative aspects, controller 1050 may be configured to determine a phase overlap between the first phase of the first radar Rx signal and the second phase of the second radar Rx signal, for example, based on the first weighted phase and the second weighted phase, e.g., as described below.

Figure 11A:
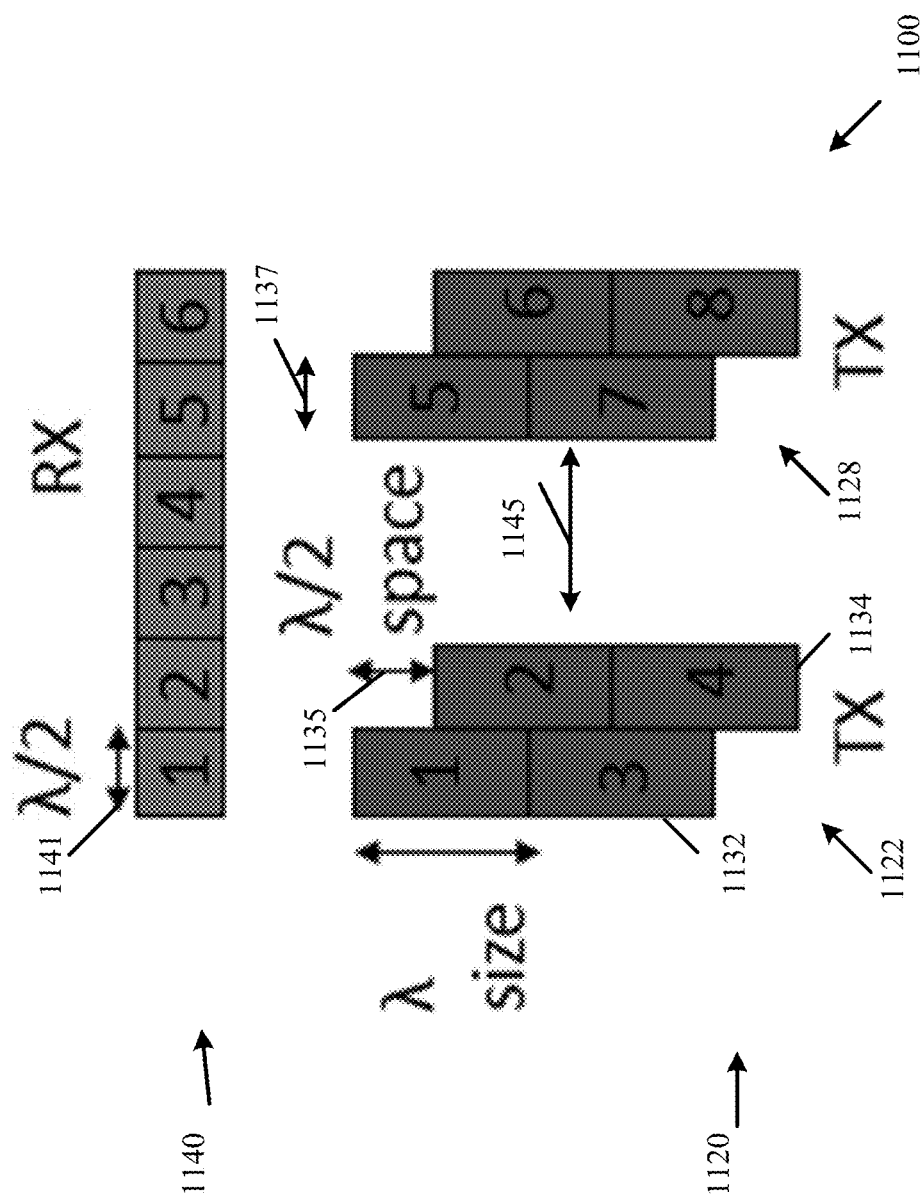
FIG. 11A is a schematic illustration of an arrangement of an antenna array, in accordance with some demonstrative aspects.
Figure 11B:
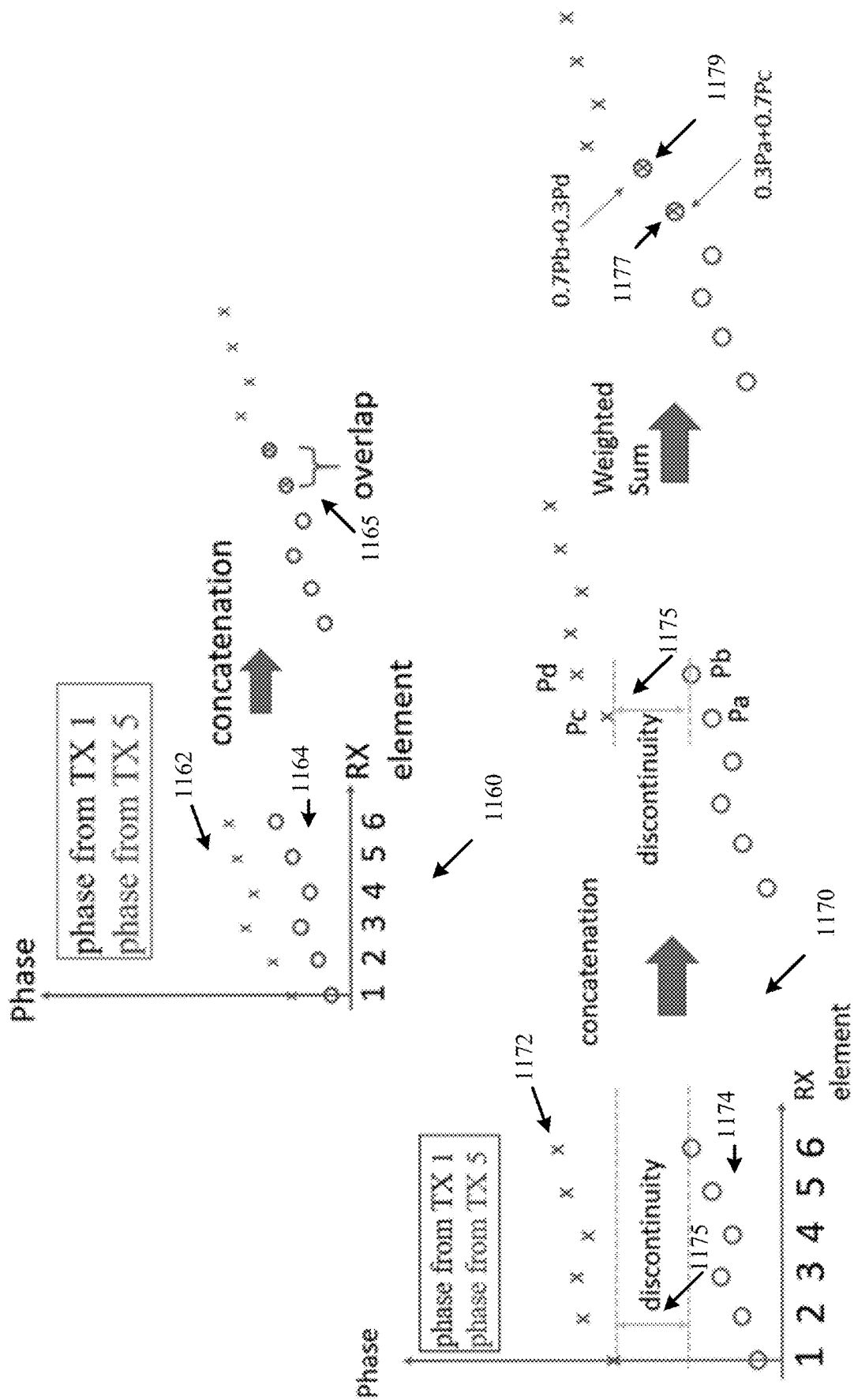
FIG. 11B is a schematic illustration of a first graph depicting first phases of first Rx radar signals received via the antenna array of FIG. 11A, and a second graph depicting second phases of second Rx radar signals received via the antenna array of FIG. 11A, in accordance with some demonstrative aspects.

Reference is made to FIG. 11A, which schematically illustrates an arrangement of an antenna array 1100, in accordance with some demonstrative aspects, and to FIG. 11B, which schematically illustrates a first graph 1160 depicting first phases of first Rx radar signals received via antenna array 1100, and a second graph 1170 depicting second phases of second Rx radar signals received via antenna array 1100, in accordance with some demonstrative aspects. For example, radar antenna 1000 (FIG. 10) may include one or more elements of radar antenna 1100, and/or may perform one or more operations and/or functionalities of radar antenna 1100.

In some demonstrative aspects, as shown in FIG. 11A, radar antenna 1100 may include a Tx antenna array 1120 and an Rx antenna array 1140, e.g., as described below. For example, Tx array 1020 (FIG. 10) may include one or more elements of Tx antenna array 1120, and/or may perform one or more operations and/or functionalities of Tx antenna array 1120; and/or Rx array 1040 (FIG. 10) may include one or more elements of Rx antenna array 1140, and/or may perform one or more operations and/or functionalities of Rx antenna array 1140.

In some demonstrative aspects, as shown in FIG. 11, the Rx antenna array 1140 may be orthogonal to the Tx antenna array 1120.

In some demonstrative aspects, the Tx antenna array 1020 may be configured to transmit a plurality of Tx radar signals.

In some demonstrative aspects, the Rx antenna array may be configured to receive a plurality of Rx radar signals based on the plurality of Tx radar signals.

In some demonstrative aspects, as shown in FIG. 11A, Tx antenna array 1120, may include a first sub-array 1122 and a second sub-array 1128, for example, parallel to the first sub-array 1122.

In some demonstrative aspects, as shown in FIG. 11A, a sub-array spacing 1145 between the first sub-array 1122 and the second sub-array 1128 may be shorter than a length of the Rx antenna array 1140.

In some demonstrative aspects, as shown in FIG. 11A, the Rx antenna array 1140 may include a 1D array including a plurality of antenna elements, for example, having a same length, e.g., along an axis parallel to the second array.

In some demonstrative aspects, as shown in FIG. 11A, a distance between a center of a first antenna element of Rx antenna array 1140 and a center of a second antenna element of the Rx antenna array 1140, which is adjacent to the first antenna element, may be equal to half the wavelength of the plurality of Tx radar signals.

In some demonstrative aspects, as shown in FIG. 11A, a length of an antenna element of the Rx antenna array 1140, along an axis parallel to Rx antenna array 1140, may be equal to half the wavelength of the plurality of Tx radar signals.

In some demonstrative aspects, as shown in FIG. 11A, the first sub-array 1122 may be identical to the second sub-array 1128.

In some demonstrative aspects, as shown in FIG. 11A, the first sub-array 1122 may include a first plurality of 1D arrays, and/or the second sub-array 1128 may include a second plurality of 1D arrays.

In some demonstrative aspects, as shown in FIG. 11A, the Rx array 1140 may include a third plurality of antenna elements.

In some demonstrative aspects, as shown in FIG. 11A, centers of the first and second pluralities of 1D arrays may be aligned with centers of respective antenna elements of the third plurality of antenna elements of the Rx array 1140.

In some demonstrative aspects, as shown in FIG. 11A, a first distance between an antenna element of the first sub-array 1122, e.g., an antenna element, denoted Tx1, and a first antenna element of the Rx array 1140, e.g., an antenna element, denoted Rx1, may be equal to a second distance between an antenna element of the second sub-array 1128, e.g., an antenna element, denoted Tx5, and a second antenna element of the Rx array 1140, e.g., e.g., an antenna element, denoted Rx5.

In some demonstrative aspects, as shown in FIG. 11A, the antenna element Rx1 of the Rx array 1140, may be above the antenna element Tx1 of the Tx array 1120, and/or the antenna element Rx5 of the Rx array 1140, may be above the antenna element Tx5 of the Tx array 1120.

In some demonstrative aspects, a total accumulation of phase and/or distance, for example, when transmitting from the antenna element Tx1 of the Tx array 1120 towards a target in a free space environment, and receiving via the antenna element Rx5 of the Rx array 1140, may be equal, for example, to a total accumulation of phase and/or distance, for example, when transmitting from the antenna element Tx5 of the Tx array 1120 towards the target in the free space environment, and receiving via the antenna element Rx1 of the Rx array 1140.

In some demonstrative aspects, a total accumulation of phase and/or distance, for example, when transmitting from the antenna element Tx1 of the Tx array 1120 towards the target in the free space environment and receiving via the antenna element Rx6 of the Rx array 1140, may be equal, for example, to a total accumulation of phase and/or distance, for example, when transmitting from the antenna element Tx5 of the Tx array 1120 towards the target in the free space environment, and receiving via the antenna element Rx6 of the Rx array 1140.

In some demonstrative aspects, there may be an overlap between phases resulting from these Tx-Rx pairs, for example, in the free space environment, e.g., as described below.

In some demonstrative aspects, graph 1160 depicts phases of Rx signals received in a free space environment, for example, via antenna array 1100.

In some demonstrative aspects, as shown in FIG. 11B, graph 1160 depicts first phases 1162 of first Rx signals received via Rx array 1140, for example, based on a first Tx signal transmitted from Tx antenna element Tx5 of Tx array 1120, for example, in the free space environment.

In some demonstrative aspects, as shown in FIG. 11B, graph 1160 depicts second phases 1164 of second Rx signals received via Rx array 1140, for example, based on a second Tx signal transmitted from Tx antenna element Tx1 of Tx array 1120 for example, in the free space environment.

In some demonstrative aspects, as shown in FIG. 11, a phase overlap 1165 may be created between first phases 1162 and second phases 1164, for example, when concatenating phases 1162 and 1164.

In some demonstrative aspects, a similar overlap may be created, for example, when concatenating phases of signals based on one or more other Tx pairs, e.g., (Tx2, Tx6), (Tx3, Tx7), and/or (Tx4, Tx8).

In some demonstrative aspects, graph 1170 depicts phases of Rx signals received in a multipath environment.

In some demonstrative aspects, as shown in FIG. 11B, graph 1170 depicts first phases 1172 of first Rx signals received via Rx array 1140, for example, based on a first Tx signal transmitted from Tx antenna element Tx5 of Tx array 1120, for example, in the multipath environment.

In some demonstrative aspects, as shown in FIG. 11B, graph 1170 depicts second phases 1174 of second Rx signals received via Rx array 1140, for example, based on a second Tx signal transmitted from Tx antenna element Tx1 of Tx array 1120 for example, in the multipath environment In some demonstrative aspects, as shown in FIG. 11B, a phase discontinuity 1175 may be created, for example, when concatenating phases 1172 and 1174.

In some demonstrative aspects, a controller, e.g., controller 1050 (FIG. 10), may be configured to mitigate or eliminate the phase discontinuity 1175, for example, based on the phase overlap 1165, e.g., in the free space environment, which may be used as a reference.

In some demonstrative aspects, the controller, e.g., controller 1050 (FIG. 10), may be configured to apply a weighted summation on one or more phases to provide a smoother curve, which may enable an improved AoA estimation, e.g., as described below.

In some demonstrative aspects, the controller, e.g., controller 1050 (FIG. 10), may be configured to control the Tx antenna array 1120 to transmit a first Tx radar signal via antenna element Tx1, and to transmit a second Tx radar signal via antenna element Tx5.

In some demonstrative aspects, the controller, e.g., controller 1050 (FIG. 10), may be configured to determine a first weighted phase, for example, by applying a first weight to a phase, denoted Pa, of a first Rx radar signal received via antenna element Rx5, and may be based on the first Tx radar signal via antenna element Tx1.

In some demonstrative aspects, the controller, e.g., controller 1050 (FIG. 10), may be configured to determine a second weighted phase, for example, by applying a second weight to a phase, denoted Pc, of a second Rx radar signal received via antenna element Rx1, and may be based on the second Tx radar signal via antenna element Tx5.

In some demonstrative aspects, the controller, e.g., controller 1050 (FIG. 10), may be configured to determine, a phase overlap 1177 between the first phase Pa and the second phase Pc, for example, based on the first weighted phase and the second weighted phase.

In some demonstrative aspects, as shown in FIG. 11B, a weight partition of about 70%-30% may be used on the phase values Pa-Pc, for example, to determine the phase overlap 1777.

In other aspects, any other weight partition may be applied to the phase values Pa and Pc, for example, to determine the phase overlap 1777.

In some demonstrative aspects, the controller, e.g., controller 1050 (FIG. 10), may be configured to determine a second weighted phase 1779, for example, based on a first phase, denoted Pb, of a third Rx radar signal, and a second phase, denoted Pd, of a fourth Rx radar signal, for example, similar to phase overlap 1777.

In some demonstrative aspects, as shown in FIG. 11A, the first sub-array 1122 and/or the second sub-array 1128 may include a staggered arrangement of a plurality 1D arrays.

In some demonstrative aspects, as shown in FIG. 11A, the plurality of 1D arrays may include a first 1D array 1132 including a first plurality of antenna elements, and a second 1D array 1134 including a second plurality of antenna elements staggered relative to the first plurality of antenna elements.

In some demonstrative aspects, as shown in FIG. 11A, a 1D-array-spacing 1135 between a beginning of the first 1D array 1132 and a beginning of the second 1D array 1134 may be may be equal to the half-wavelength, e.g., $\lambda/2$, of the plurality of Tx radar signals.

In some demonstrative aspects, as shown in FIG. 11A, a length of an antenna element, e.g., each antenna element, of Tx array 1120 may be equal to the wavelength of the plurality of Tx radar signals, e.g., A.

In some demonstrative aspects, as shown in FIG. 11A, a width 1137 of an antenna element, e.g., each antenna element, of Tx array 1140 may be equal to a length 1141 of an antenna element, e.g., each antenna element, of the Rx array 1140.

In some demonstrative aspects, as shown in FIG. 11A, the width 1137 and the length 1141 may be equal to half the wavelength e.g., $\lambda/2$, of the plurality of Tx radar signal.

In some demonstrative aspects, as shown in FIG. 11, the width 1137 of the antenna element of the first 1D array 1132 and the length 1141 of the antenna element of the second array 1140 may be defined, for example, along an axis parallel to the second array 1140.

In some demonstrative aspects, as shown in FIG. 11, a distance between a center of a first antenna element of Tx array 1120 and a center of a second antenna element of Tx array 1120, which may be adjacent to the first antenna element, may be not greater than the wavelength of the plurality of Tx radar signals.

In one example, the staggered arrangement of antenna array 1100 may allow to keep a half-wavelength array spacing in Tx array 1120, which may allow, for example, to support grating lobe suppression, for example, while doubling an antenna size from the half-wavelength array spacing $\lambda/2$ to a wavelength array spacing $1\lambda$. According to this example, the wavelength array spacing $1\lambda$ may provide an increased gain and/or a narrower beam, for example, compared to the half-wavelength array spacing $\lambda/2$. Therefore, antenna array 110 may allow transmitting less energy towards a road. Accordingly, a reduced number of AoA errors, e.g., along an elevation dimension, may be created.

Figure 12:
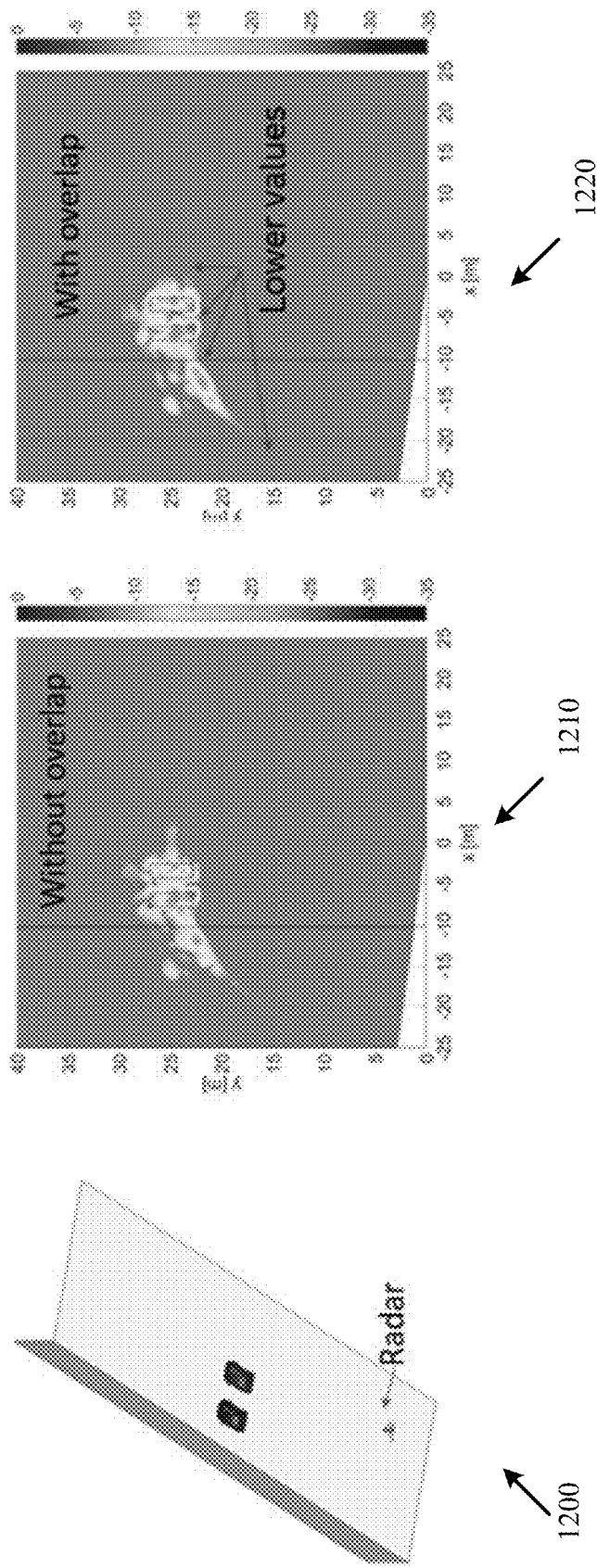
FIG. 12 is a schematic illustration of simulation results of a radar detection scheme, in accordance with some demonstrative aspects.

Reference is made to FIG. 12, which schematically illustrates simulation results of a radar detection scheme 1200, in accordance with some demonstrative aspects.

In some demonstrative aspects, as shown in FIG. 12, radar detection scheme 1200 may simulate ray tracing of radar detection strengths in a multipath-environment. For example, radar detection scheme 1200 may simulate ray tracing of radar detection strengths of two cars on a road, for example, in presence of a side barrier causing multipath conditions.

In some demonstrative aspects, as shown in FIG. 12, a first graph 1210 depicts first simulation results of an orthogonal antenna array, e.g., without the staggered arrangement and/or the antenna array overlap features.

In some demonstrative aspects, as shown in FIG. 12, a second graph 1210 depicts second simulation results of antenna array 1100 (FIG. 11).

In some demonstrative aspects, as shown in FIG. 12, the second simulation results may be better, for example, compared to the first simulation results.

Referring back to FIG. 8, in some demonstrative aspects, there may be a need to provide a technical solution to efficiently and/or accurately detect velocities of targets in one or more scenarios and/or environments, e.g., as described below.

In one example, an accurate detection of velocities of multiple moving cars and/or other targets may require large compute resources and/or a large amount of complexity of signal processing.

In some demonstrative aspects, there may be one or more disadvantages, inefficiencies, and/or technical problems, for example, in one or more solutions for velocity estimation of targets, which may be based on a multi-frame approach or a single frame approach, e.g., as described below.

In one example, the multi-frame approach may change a pulse repetition interval (PRI) between frames, which may result in folded targets appearing in every frame at a different speed. For example, analysis of speed-jumps between frames may allow determining a correct velocity.

In another example, the single frame approach may be based, for example, on a brute force calculation, which may handle all possible speed hypotheses, for example, to allow later stages to select a correct velocity.

According to these examples, the multi-frame approach and/or the single frame approach may be complicated and/or may require a large amount of computing resources.

In some demonstrative aspects, there may be a need to provide a technical solution, e.g., for target velocity estimation, for example, which may take advantage of a row-column structure of an antenna array, e.g., antenna array 1000 (FIG. 10), and/or antenna array 1100 (FIG. 11), e.g., as described below.

For example, one or more target velocity estimation methods may not consider the row-column structure of an antenna array, and therefore, a large amount of computing resources may be required, for example, for the target velocity estimation.

In some demonstrative aspects, radar processor 834 may be configured to implement and/or support a velocity estimation algorithm, which may be configured to leverage the array topology of radar antenna 881, e.g., according to the topology of antenna array 1000 (FIG. 10), and/or antenna array 1100 (FIG. 11), e.g., as described below.

In some demonstrative aspects, the velocity estimation algorithm may allow to detect fast moving targets, for example, while requiring a reduced amount of compute power and/or a reduced amount of computing resources, e.g., as described below.

In some demonstrative aspects, radar processor 834 may be configured to support and/or implement a Doppler algorithm, which may be configured to determine a plurality of Doppler folding factors for a range-Doppler bin, e.g., as described below.

In some demonstrative aspects, the plurality of Doppler folding factors may be utilized to enhance and/or improve a velocity estimation algorithm, e.g., as described below.

In some demonstrative aspects, the Doppler algorithm may be configured to leverage an array topology of radar antenna 881, e.g., according to the topology of antenna array 1000 (FIG. 10), and/or antenna array 1100 (FIG. 11), for example, for an accurate velocity estimation, for example, utilizing a reduced amount of computing resources.

Some demonstrative aspects described herein with respect to a Doppler algorithm configured for the array topologies of radar antenna 881, antenna array 1000 (FIG. 10), and/or antenna array 1100 (FIG. 11). However, the Doppler algorithm may be configured for any other topology of an antenna array, e.g., an antenna array including a Tx array and an Rx Array orthogonal to the Tx array.

In one example, the Doppler algorithm may be configured for an antenna array, which may have a decoupling between a Tx array and an Rx array. For example, the Tx array may be vertical and Rx array may be horizontal, or vice versa.

In another example, the Doppler algorithm may be configured for an antenna array, which may use a Time Division Multiple Access (TDMA) MIMO transmission scheme.

In some demonstrative aspects, the Doppler algorithm may be configured to determine an accurate velocity estimation, for example, based on a combination of a plurality of metrics, e.g., including two metrics, which may be associated with an arrangement of the Tx array, e.g., Tx columns of the Tx array, and/or an arrangement of the Rx array, for example, an Rx row, e.g., as described below.

In some demonstrative aspects, processor 836 may be configured to determine virtual radar antenna information of a two dimensional (2D) virtual antenna based on the radar Rx signals as represented by radar Rx data 811, e.g., as described below.

, In some demonstrative aspects, processor 836 may be configured to detect one or more angles from a plurality of angles based on virtual radar antenna information of a plurality of one dimensional (1D) virtual arrays in a first dimension of the 2D virtual antenna, e.g., as described below.

In some demonstrative aspects, processor 836 may be configured to determine one or more Doppler folding factors corresponding to the one or more angles, e.g., as described below.

In some demonstrative aspects, processor 836 may be configured to determine a Doppler folding factor corresponding to an angle of the one or more angles, e.g., as described below.

In some demonstrative aspects, processor 836 may be configured to determine a plurality of hypothesis scores for a plurality of hypotheses corresponding to the angle, e.g., as described below.

In some demonstrative aspects, a hypothesis of the plurality of hypotheses may include a hypothetic Doppler folding factor for the angle, e.g., as described below.

In some demonstrative aspects, a hypothesis score for the hypothesis may be based on virtual radar antenna information of a 1D virtual array in a second dimension of the 2D virtual antenna, e.g., as described below.

In some demonstrative aspects, processor 836 may be configured to determine a selected hypothesis from the plurality of hypotheses corresponding to the angle, for example, based on the plurality of hypothesis scores, e.g., as described below.

In some demonstrative aspects, processor 836 may be configured to determine the Doppler folding factor corresponding to the angle, for example, based on the selected hypothesis, e.g., as described below.

In some demonstrative aspects, processor 836 may be configured to determine the radar information 813, for example, based on the one or more Doppler folding factors, e.g., as described below.

In some demonstrative aspects, the first dimension of the 2D virtual antenna may include a raw-dimension, and/or the second dimension of the 2D virtual antenna may include a column-dimension, e.g., as described below.

In other aspects, the first dimension of the 2D virtual antenna may include the column-dimension, and/or the second dimension of the 2D virtual antenna may include the row-dimension.

In some demonstrative aspects, processor 836 may be configured to determine an energy vector including a plurality of energy values corresponding to the plurality of angles, for example, based on the plurality of 1D virtual arrays in the first dimension of the 2D virtual antenna, e.g., as described below.

In some demonstrative aspects, processor 836 may be configured to detect the one or more angles from the plurality of angles, for example, based on an energy criterion corresponding to the plurality of energy values, e.g., as described below.

In some demonstrative aspects, processor 836 may be configured to determine the hypothesis score for to the hypothesis including the hypothetic Doppler folding factor for the angle, for example, based on one or more metrics, e.g., as described below.

In some demonstrative aspects, processor 836 may be configured to determine an energy spectrum, for example, based on the hypothetic Doppler folding factor for the angle, and the virtual radar antenna information of the 1D virtual array in the second dimension of the 2D virtual antenna, e.g., as described below.

In some demonstrative aspects, processor 836 may be configured to determine the hypothesis score corresponding to the hypothesis, for example, based on a peak-to-average score for the energy spectrum and/or a Root Mean Square (RMS) bandwidth score for the energy spectrum, e.g., as described below.

In other aspects, processor 836 may be configured to determine the hypothesis score corresponding to the hypothesis, for example, based on any other additional or alternative metrics, e.g., different from the peak-to-average score and/or the RMS bandwidth score.

In some demonstrative aspects, the Doppler algorithm may include, may utilize, and/or may be based on, some or all of three processes, phases, stages, and/or methods, e.g., a selection of a transmission order, a detection of one or more angles, and/or a selection of Doppler folding factors corresponding to the one or more angles, e.g., as described below.

In other aspects, the Doppler algorithm may be based on any other additional and/or alternative processes, methods and/or stages.

Figure 13:
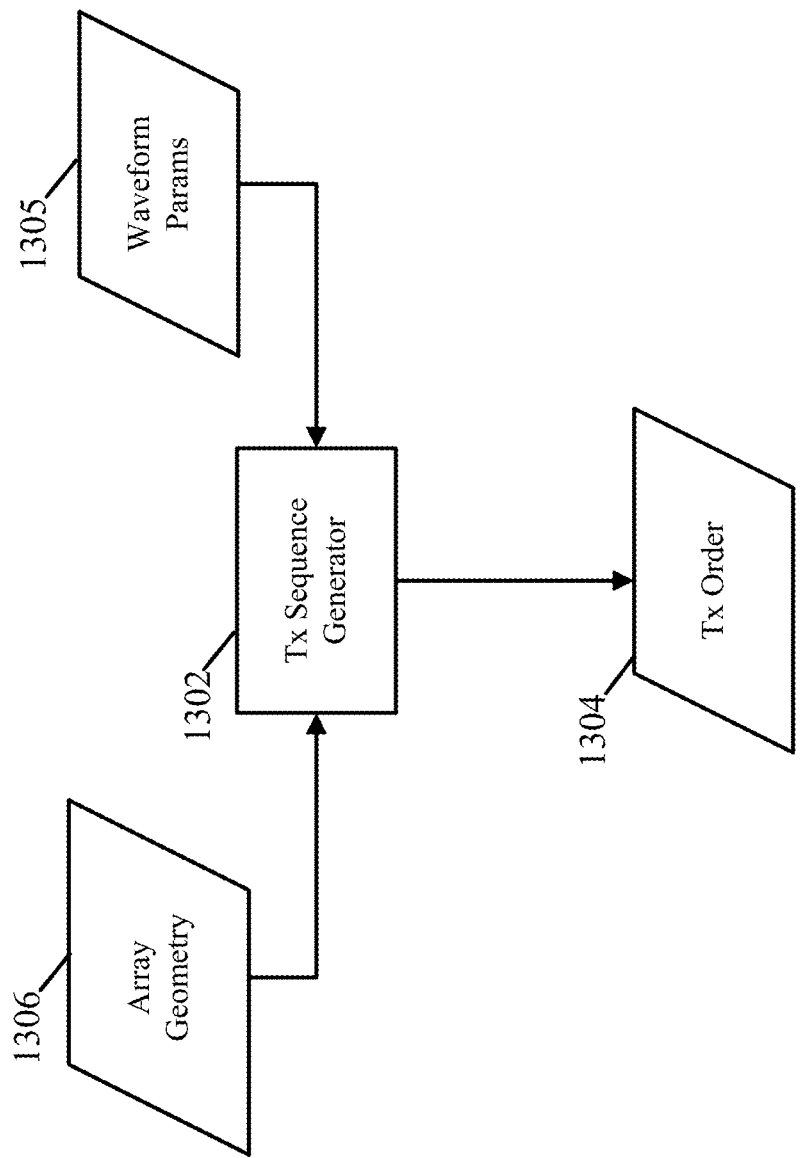
FIG. 13 is a schematic flow-chart illustration of a method of determining a transmission order for transmission of radar signals via a radar antenna, in accordance with some demonstrative aspects.

Reference is made to FIG. 13, which schematically illustrates a method of determining a transmission order for transmission of radar signals via a radar antenna, in accordance with some demonstrative aspects.

In some demonstrative aspects, radar processor 834 (FIG. 8), and/or processor 836 (FIG. 8) may be configured to implement one or more operations of the method of FIG. 13 to determine a transmission order to transmit the Tx radar signals via a radar antenna, for example, radar antenna 881 (FIG. 8), antenna array 1000 (FIG. 10), or antenna array 1100 (FIG. 11).

In some demonstrative aspects, as indicated at block 1302, the method may include generating a transmit-sequence 1304, for example, based on an array geometry 1306 of the antenna array and/or one or more parameters 1305 of radar signals communicated via the antenna array. For example, radar processor 834 (FIG. 8), and/or processor 836 (FIG. 8) may be configured to generate the transmit-sequence 1304, for example, based on the radar Rx signals and/or an array geometry of radar antenna 881 (FIG. 8), antenna array 1000 (FIG. 10), or antenna array 1100 (FIG. 11).

In one example, a selection of a wrong Doppler folding factor may be transformed into a residual phase, for example, due to object movements during a time gap between transmitters. According to this example, in order to use a separable approach, a time delay between transmitters on a same row of a Tx array may be minimized.

In some demonstrative aspects, radar processor 834 (FIG. 8), and/or processor 836 (FIG. 8) may be configured to select a transmission-order, which may reduce spatial processing gain, for example, when a wrong Doppler folding factor is selected, for example, to detect a correct Doppler folding factor.

In one example, a residual phase may become linear, e.g., in a spatial domain, which correspond to a wrong direction, for example, when a transmission order, which may be a same as a geometric order may be selected.

Figure 14:
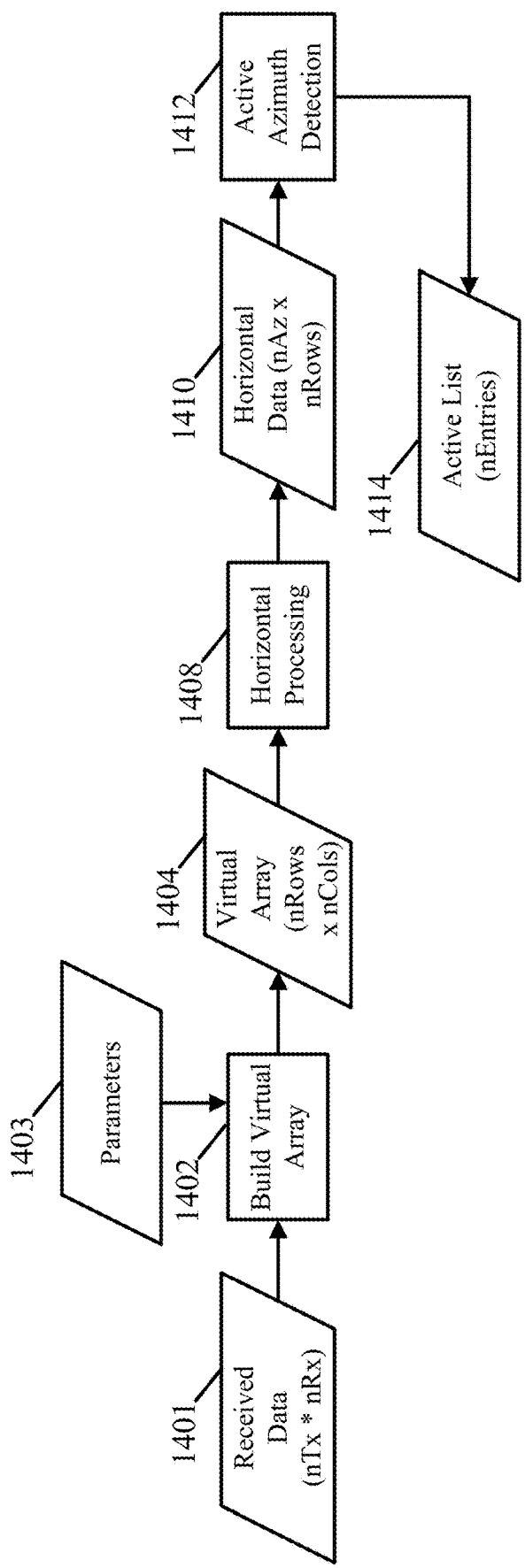
FIG. 14 is a schematic flow-chart illustration of a method of detecting one or more angles based on virtual radar antenna information, in accordance with some demonstrative aspects.

Reference is made to FIG. 14, which schematically illustrates a method of detecting one or more angles from a plurality of angles based on virtual radar antenna information, in accordance with some demonstrative aspects.

In some demonstrative aspects, radar processor 834 (FIG. 8), and/or processor 836 (FIG. 8) may be configured to implement one or more operations of the method of FIG. 14 to detect one or more angles detect one or more angles from a plurality of angles based on the virtual radar antenna information of the 2D virtual antenna, which is based on radar antenna 881 (FIG. 8), antenna array 1000 (FIG. 10), or antenna array 1100 (FIG. 11).

In some demonstrative aspects, as indicated at block 1402, the method may include determining virtual radar antenna information 1404 of a 2D virtual antenna, for example, based on radar data 1401, and/or one or more parameters 1403 of a radar antenna. For example, radar processor 834 (FIG. 8), and/or processor 836 (FIG. 8) may be configured to determine the virtual radar antenna information 1404, for example, based on the radar Rx signals, e.g., as represented by radar Rx data 811, and/or one or more parameters of radar antenna 881 (FIG. 8), antenna array 1000 (FIG. 10), and/or antenna array 1100 (FIG. 11).

In some demonstrative aspects, as indicated at block 1408, the method may include horizontal processing of the virtual radar antenna information 1404, for example, to generate horizontal dada 1410. For example, radar processor 834 (FIG. 8), and/or processor 836 (FIG. 8) may be configured to generate horizontal dada 1410, for example, based on the virtual radar antenna information 1404.

In some demonstrative aspects, horizontal dada 1410 may include a plurality of angles, e.g., azimuth angles, corresponding to a plurality of 1D virtual arrays, e.g., a plurality of rows of the 2D virtual antenna. For example, horizontal dada 1410 may include the energy vector including the plurality of energy values corresponding to the plurality of angles.

In some demonstrative aspects, as indicated at block 1412, the method may include detecting one or more angles 1414, e.g., in the form of an "active list" of angles, from the plurality of angles, for example, based on horizontal dada 1410. For example, radar processor 834 (FIG. 8), and/or processor 836 (FIG. 8) may be configured to detect the one or more angles in the energy vector, for example, based on an energy criterion to be applied to the horizontal dada 1410.

In some demonstrative aspects, the horizontal processing at block 1408 may include a horizontal spatial transform, e.g., using an FFT or any other method, for example, to detect areas having a high energy level, which may potentially be a target.

In some demonstrative aspects, radar processor 834 (FIG. 8), and/or processor 836 (FIG. 8) may perform the horizontal spatial transform, for example, based on a plurality of 1D arrays corresponding to the Rx array. For example, the Rx array may not suffer from a Doppler ambiguity, e.g., as all Rx channels may be received at a same time.

In some demonstrative aspects, the horizontal processing at block 1408 may include a non-coherent summation of horizontal dada 1410, for example, to improve an SNR and/or to allow a higher probability of detection, for example, after the horizontal spatial transform.

In some demonstrative aspects, radar processor 834 (FIG. 8), and/or processor 836 (FIG. 8) may be configured to detect (block 1412) the one or more angles in the energy vector, which may be a result of the non-coherent summation.

Figure 15:
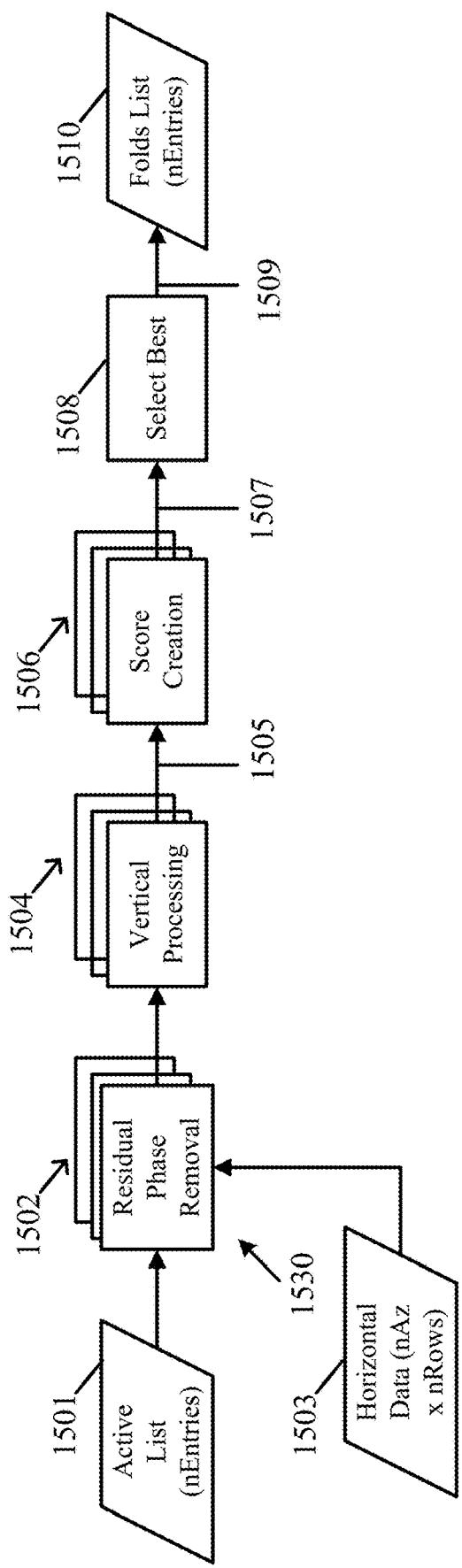
FIG. 15 is a schematic flow-chart illustration of a method of determining one or more Doppler folding factors, in accordance with some demonstrative aspects.

Reference is made to FIG. 15, which schematically illustrates a method of determining one or more Doppler folding factors, in accordance with some demonstrative aspects.

In some demonstrative aspects, radar processor 834 (FIG. 8), and/or processor 836 (FIG. 8) may be configured to implement one or more operations of the method of FIG. 15 to determine the one or more Doppler folding factors.

In some demonstrative aspects, as indicated at blocks 1502, the method may include removing a residual phase for a plurality of hypothesis 1530, which may be considered for a detected angle of one or more detected angles 1501, e.g., including the active list of the one or more angles 1414 (FIG. 14).

In some demonstrative aspects, as indicated at blocks 1502, removing the residual phase for the plurality of hypothesis 1530 may be based on horizontal data 1503 of virtual radar antenna information of the antenna ray, e.g., horizontal dada 1410 (FIG. 14). For example, radar processor 834 (FIG. 8), and/or processor 836 (FIG. 8) may be configured to remove the residual phase for the plurality of hypothesis 1530, e.g., considered for the detected angle.

In some demonstrative aspects, removing the residual phase for the plurality of hypothesis 1530 may be performed in one or more columns, e.g., in each column, of the virtual radar antenna information 1404 (FIG. 4).

In one example, the residual phase may be assumed to be caused by movement of a target.

In some demonstrative aspects, as indicated at blocks 1504, the method may include vertical processing of the virtual radar antenna information 1404 (FIG. 14), for example, after removing the residual phase from the virtual radar antenna information 1404 (FIG. 14).

In some demonstrative aspects, the vertical processing may be configured to generate a plurality of energy spectrums 1505, for example, based on the plurality of hypothesis 1530. For example, radar processor 834 (FIG. 8), and/or processor 836 (FIG. 8) may be configured to generate the plurality of energy spectrums 1505, for example, based on the plurality of hypothesis 1530 considered for the detected angle.

In one example, the vertical processing may include a vertical spatial transform, e.g., an FFT or any other method.

In some demonstrative aspects, as indicated at blocks 1506, the method may include determining a plurality of hypothesis scores 1507 for the plurality of hypotheses 1530 corresponding to the angle. For example, radar processor 834 (FIG. 8), and/or processor 836 (FIG. 8) may be configured to determine the plurality of hypothesis scores 1507, for example, based on the plurality of energy spectrums 1505.

In some demonstrative aspects, an energy spectrum 1505, e.g., as a result of a spatial transform of the vertical processing, may be analyzed using the plurality of hypothesis scores 1507, which may describe a concentration of energy, e.g., similar to focus scoring, or the like.

In some demonstrative aspects, as indicated at block 1508, the method may include determining a selected hypothesis score 1509 from the plurality of hypotheses scores 1507 for the detected angle. For example, radar processor 834 (FIG. 8), and/or processor 836 (FIG. 8) may be configured to determine the selected hypothesis score 1509, for example, based on the plurality of hypothesis scores 1507.

In some demonstrative aspects, the method may include determining a Doppler folding factor corresponding to the detected angle of the one or more detected angles 1501, for example, based on the selected hypothesis score 1509.

In some demonstrative aspects, the method may include determining one or more Doppler folding factors 1510 corresponding to the one or more detected angles 1501, for example, based on one or more selected hypothesis scores 1509 corresponding to the one or more detected angles 1501. For example, radar processor 834 (FIG. 8), and/or processor 836 (FIG. 8) may be configured to determine the one or more Doppler folding factors, for example, based on one or more selected hypotheses scores 1509.

In some demonstrative aspects, radar processor 834 (FIG. 8) and/or processor 836 (FIG. 8) may be configured to remove a residual phase corresponding to the one or more Doppler folding factors 1510, from radar Doppler information, e.g., virtual radar antenna information 1404 (FIG. 14), for example, which may enhance and/or improve Doppler processing of radar Doppler information in further stages.

In some demonstrative aspects, the method of FIG. 15 may be applied to every column of the virtual radar antenna information 1404 (FIG. 14) which may be detected by the method of FIG. 14.

In some demonstrative aspects, radar processor 834 (FIG. 8) and/or processor 836 (FIG. 8) may be configured to determine a Doppler folding factor, e.g. a Doppler folding factor 1510, for example, based on a combination of metrics, e.g., two or more metrics, which may describe one or more spectral characteristics. For example, radar processor 834 (FIG. 8) and/or processor 836 (FIG. 8) may be configured to determine a selected hypothesis score 1509, for example, based on a peak to average metric, and/or an RMS bandwidth metric, e.g., as described below.

In some demonstrative aspects, the peak to average score may be in a log-space, and/or the RMS bandwidth may be in a linear space.

In some demonstrative aspects, the peak to average score may be defined, e.g., as follows:

$$PeakToAverage = \text{Max}(P) - \frac{\sum_{n=1}^{N} P(n)}{N} \quad (1)$$

wherein P denotes power, N denotes a count of energy samples, and P(n) denotes a power corresponding to an n-th sample.

In some demonstrative aspects, the RMS bandwidth score may be defined, for example, as an approximation to an elevation RMS bandwidth, for example, based on a center of mass of an object, e.g., as follows:

$$CenterOfMass = \frac{\sum_{n=1}^{N} (P(n)*n)}{\sum_{n=1}^{N} P(n)} \quad (2)$$

$$RMSscore = \frac{\sum_{n=1}^{N} |CenterofMass - n| * P(n)}{\sum_{n=1}^{N} P(n)}$$

In some demonstrative aspects, the peak to average score and/or the RMS bandwidth score may be normalized, for example, to include values in a range between zero and one.

In some demonstrative aspects, the peak to average score may provide a relatively accurate differentiation between a wrong Doppler folding factor and a correct Doppler folding factor, for example, when an energy of a detected target is concentrated into a small region.

In some demonstrative aspects, the RMS bandwidth score may provide a relatively accurate differentiation between a wrong Doppler folding factor and a correct Doppler folding factor, for example, when a target is distributed.

In some demonstrative aspects, radar processor 834 (FIG. 8) and/or processor 836 (FIG. 8) may be configured to select a highest score of the two metrics. The selection of the hypothesis based on both the peak to average score and the RMS bandwidth score may provide better results, e.g., significantly better results, for example, by a factor of 10, e.g., compared to a selection, which is based on only one of the metrics.

Figure 16:
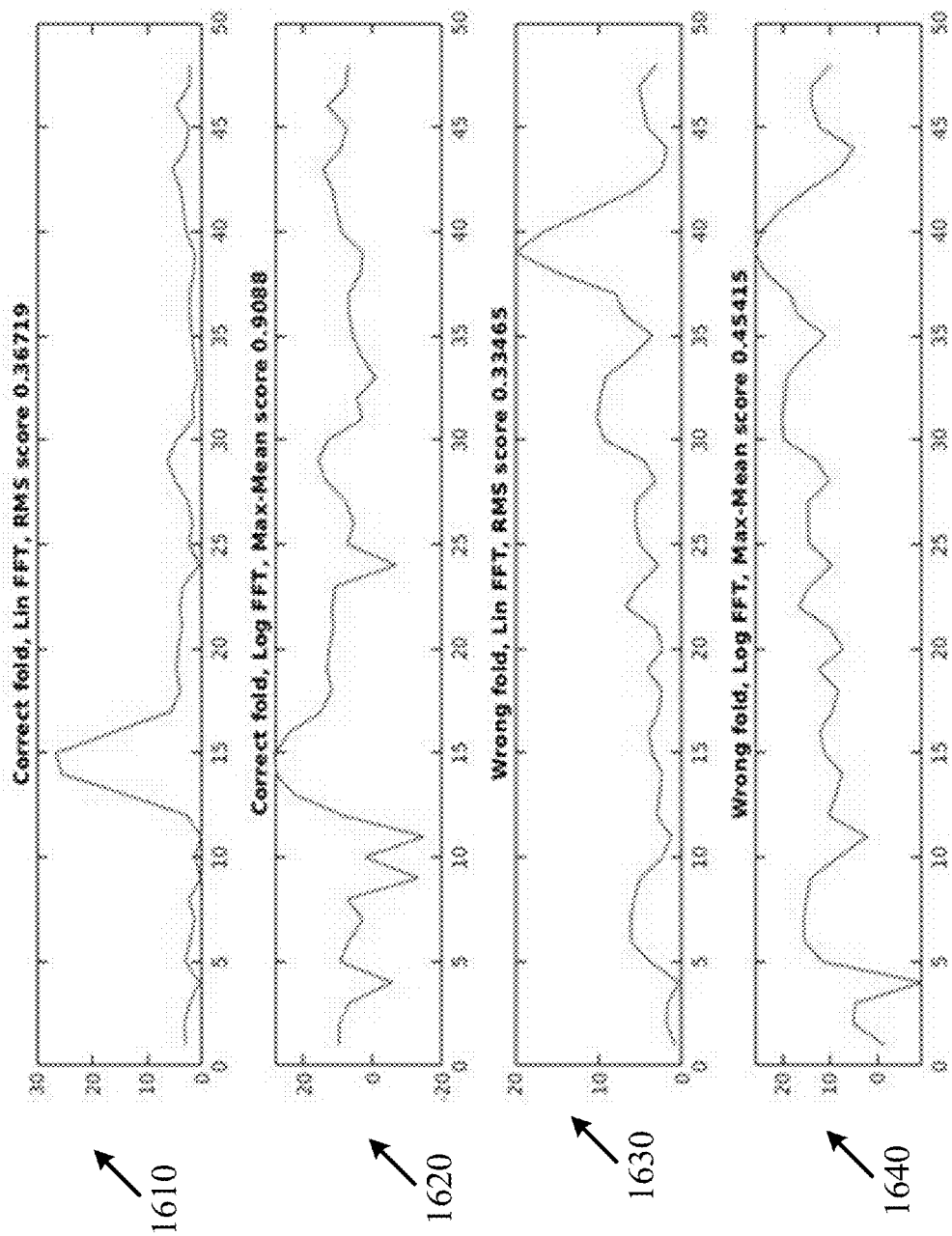
FIG. 16 is a schematic illustration of graphs depicting a plurality of energy spectrums corresponding to a respective plurality of hypothesis scores of hypotheses corresponding to an angle, in accordance with some demonstrative aspects.

Reference is made to FIG. 16, which schematically illustrates graphs depicting a plurality of energy spectrums corresponding to a respective plurality of hypothesis scores of hypotheses corresponding to an angle, in accordance with some demonstrative aspects.

In one example, the energy spectrums may correspond to a single target with an SNR of 17 decibel (dB).

In some demonstrative aspects, as shown in FIG. 16, a graph 1610 depicts an energy spectrum corresponding to an RMS bandwidth score of a correct hypothesis.

In some demonstrative aspects, as shown in FIG. 16, the RMS bandwidth score of the correct hypothesis may be 0.36719.

In some demonstrative aspects, as shown in FIG. 16, a graph 1620 depicts an energy spectrum corresponding to a peak to average score of the correct hypothesis.

In some demonstrative aspects, as shown in FIG. 16, the peak to average score of the correct hypothesis may be 0.9088.

In some demonstrative aspects, as shown in FIG. 16, a graph 1630 depicts an energy spectrum corresponding to an RMS bandwidth score of a wrong hypothesis.

In some demonstrative aspects, as shown in FIG. 16, the RMS bandwidth score of the wrong hypothesis may be 0.33465.

In some demonstrative aspects, as shown in FIG. 16, a graph 1640 depicts an energy spectrum corresponding to a peak to average score of the wrong hypothesis.

In some demonstrative aspects, as shown in FIG. 16, the peak to average score of the wrong hypothesis may be 0.45415.

In some demonstrative aspects, radar processor 834 (FIG. 8) and/or processor 836 (FIG. 8) may be configured to select the hypothesis corresponding to the highest score of the two metrics, e.g., the peak to average score 0.9088 representing the correct hypothesis.

In some demonstrative aspects, as shown in FIG. 16, the RMS bandwidth score may not differentiate between the correct hypothesis and the wrong hypothesis, e.g., as the RMS bandwidth scores are almost the same. However, the peak to average score may provide a clear indication of the correct hypothesis.

Figure 17:
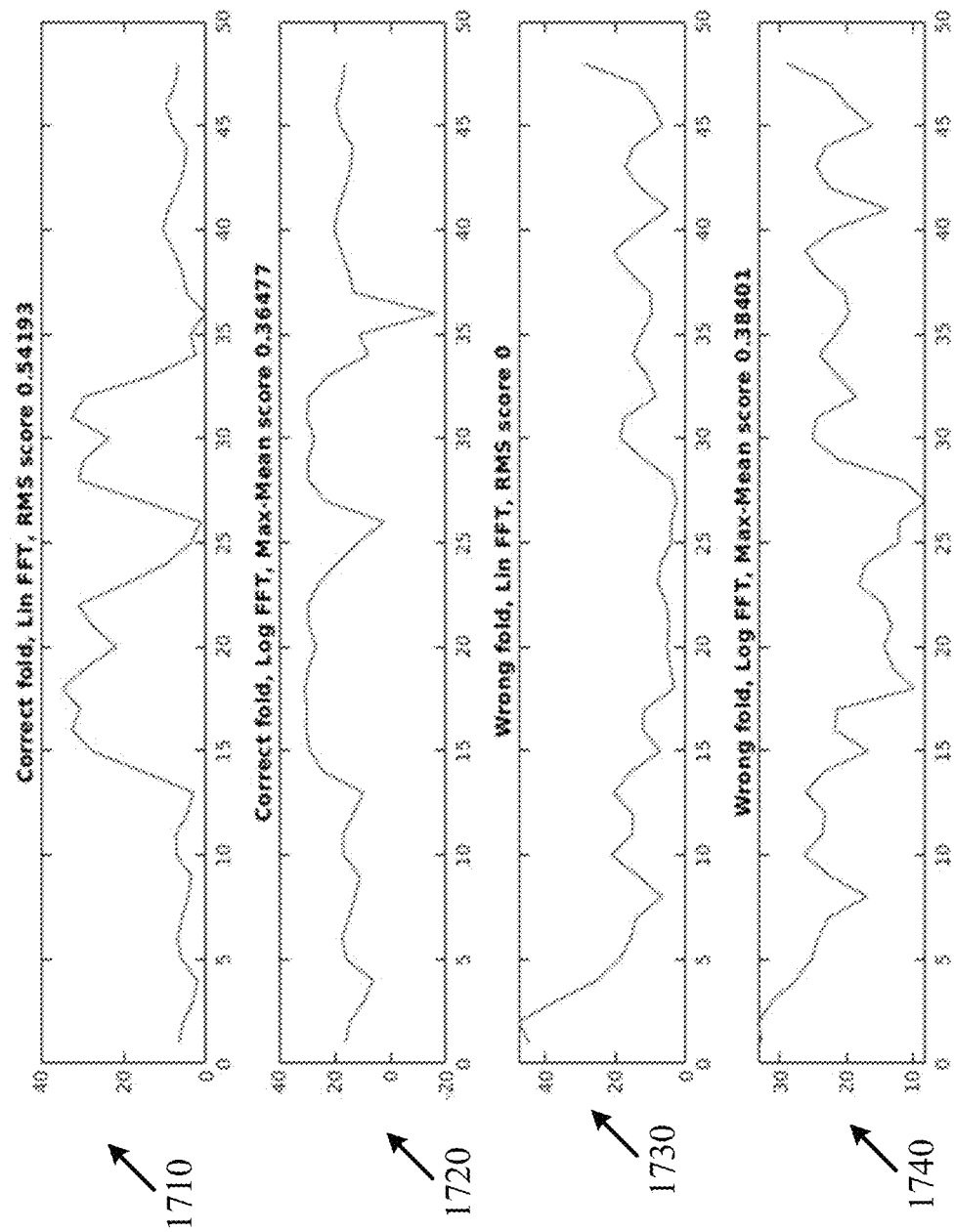
FIG. 17 is a schematic illustration of graphs depicting a plurality of energy spectrums corresponding to a respective plurality of hypothesis scores of hypotheses corresponding to an angle, in accordance with some demonstrative aspects.

Reference is made to FIG. 17, which schematically illustrates graphs depicting a plurality of energy spectrums corresponding to a respective plurality of hypothesis scores of hypotheses corresponding to an angle, in accordance with some demonstrative aspects.

In one example, the energy spectrums may correspond to a single target with an SNR of 17.

In some demonstrative aspects, as shown in FIG. 17, a graph 1710 depicts an energy spectrum corresponding to an RMS bandwidth score of a correct hypothesis.

In some demonstrative aspects, as shown in FIG. 17, the RMS bandwidth score of the correct hypothesis may be 0.54193.

In some demonstrative aspects, as shown in FIG. 17, a graph 1720 depicts an energy spectrum corresponding to a peak to average score of the correct hypothesis.

In some demonstrative aspects, as shown in FIG. 17, the peak to average score of the correct hypothesis may be 0.36477.

In some demonstrative aspects, as shown in FIG. 17, a graph 1730 depicts an energy spectrum corresponding to an RMS bandwidth score of a wrong hypothesis.

In some demonstrative aspects, as shown in FIG. 17, the RMS bandwidth score of the wrong hypothesis may be 0.

In some demonstrative aspects, as shown in FIG. 17, a graph 1740 depicts an energy spectrum corresponding to a peak to average score of the wrong hypothesis.

In some demonstrative aspects, as shown in FIG. 17, the peak to average score of the wrong hypothesis may be 0.38401.

In some demonstrative aspects, radar processor 834 (FIG. 8), and/or processor 836 (FIG. 8) may be configured to select the hypothesis corresponding to the highest score of the two metrics, e.g., the RMS bandwidth score of 0.54193 representing the correct hypothesis.

In some demonstrative aspects, as shown in FIG. 17, the peak to average score may indicate a wrong hypothesis, e.g., as the wrong hypothesis may have a higher score according to the peak to average metric. However, the RMS bandwidth scores may provide a clear indication of the correct hypothesis, e.g., the RMS bandwidth score of 0.54193 of the correct hypothesis compared to the RMS bandwidth score of 0 of the wrong hypothesis.

In some demonstrative aspects, a dominant direction may be determined, for example, when using a Tx array, which does not include a 1D array, e.g., as in antenna array 1000 (FIG. 10), and/or antenna array 1100 (FIG. 11).

In one example, a Tx array with 2 columns of 16 Tx antenna elements may be used. According to this example, transmission via two Tx antenna elements of a same row may be consecutive. According to this setting, the Tx array may be processed as an array of 16 Tx antenna elements in a 1D array with double Rx channels.

In some demonstrative aspects, this implementation may result in a small phase jump and/or difference, e.g., due to a movement of a target. However, the phase jump and/or difference may be neglected, for example, in the horizontal processing at block 1408 (FIG. 14), e.g., as described below.

In some demonstrative aspects, an Rx transform may suffer from a phase difference (phase jump), denoted PhaseDiff, for example, when a Tx array of an antenna array is not configured as a 1D array.

In some demonstrative aspects, the phase difference PhaseDiff f may be bound, for example, based on a maximal speed of a target, for example, when a direction falls on one tested hypothesis, for example, assuming no straddling loss, e.g., as follows:

$$PhaseDiff \leq \frac{MaxSpeed * 2 * 2\Pi * T_{gap}}{\lambda} \quad (3)$$

In one example, assuming a maximal target speed of 50 m/s, a PRI of 2.4 microseconds (us), and/or a radar device frequency of 79 GHz, the phase difference PhaseDiff may be less than or equal to 0.4, e.g., as follows:

$$PhaseDiff \leq \frac{50 * 2 * 2\Pi * 2.4 * 10^{-6}}{0.0038} = 0.4 \quad (4)$$

In some demonstrative aspects, a gain loss, denoted Loss, may be determined, for example, based on a comparison between a sum of two vectors with different phases, and a fully coherent summation, e.g., as follows:

$$Loss = 20\log\left(\frac{2}{1 + \cos PhaseDiff}\right) \leq 0.35 \text{ dB}. \quad (5)$$

In some demonstrative aspects, the phase difference PhaseDiff may represent a phase difference between two sub-arrays of an antenna array, e.g., subarray 1022 and 1028 (FIG. 10), for example, when a target is not at a tested hypothesis.

In some demonstrative aspects, a simulation may be performed, for example, to determine an effect of the phase difference on an accuracy of a determined Doppler folding factor.

In some demonstrative aspects, the results of the simulation may be based on a distance from a direction of a tested hypothesis.

Figure 18:
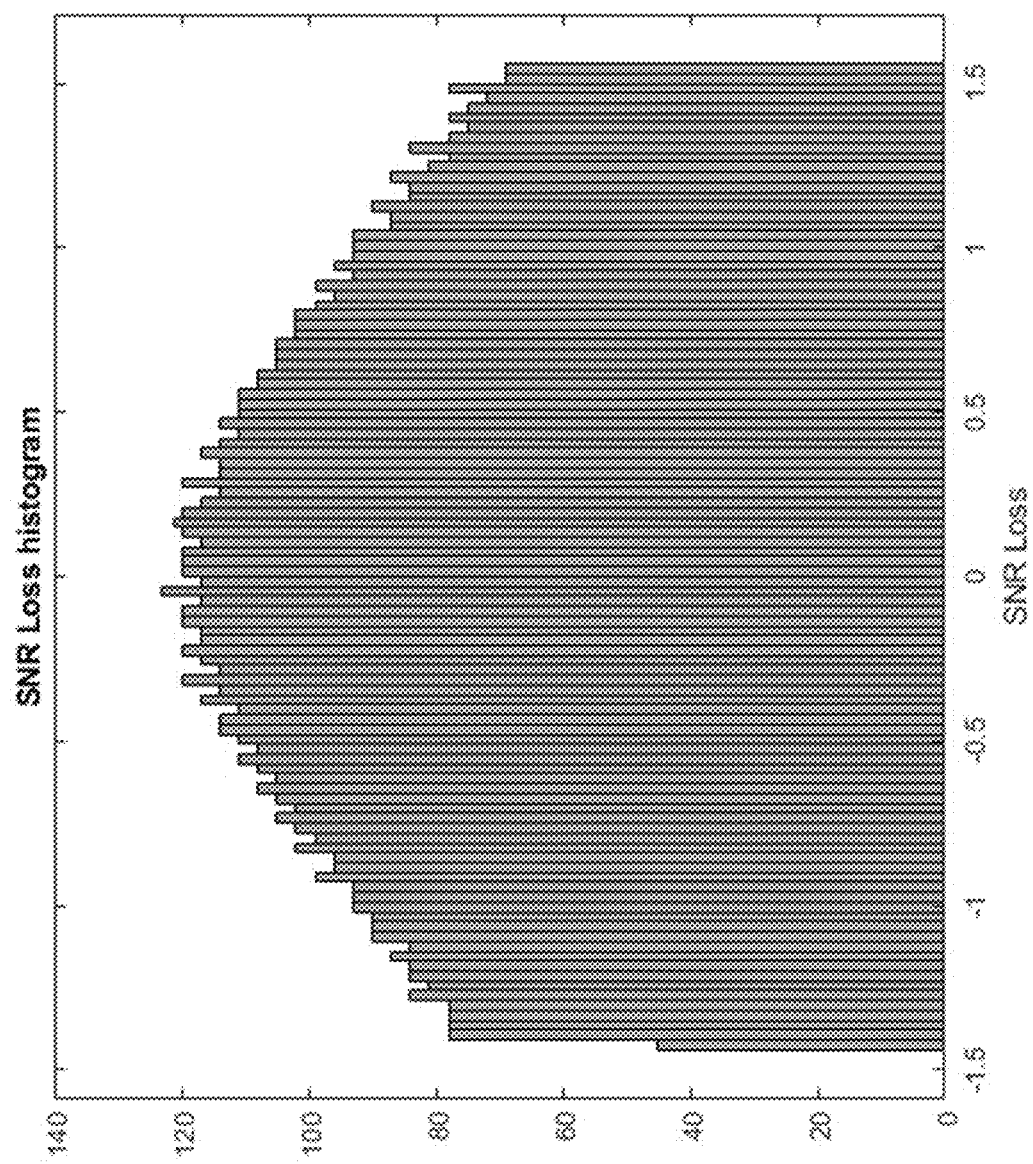
FIG. 18 is a schematic illustration of a histogram of a phase difference based on Signal to Noise Ratio (SNR) losses, in accordance with some demonstrative aspects.

Reference is made to FIG. 18, which schematically illustrates a histogram 1800 of the phase difference PhaseDiff f based on SNR losses, in accordance with some demonstrative aspects.

In some demonstrative aspects, histogram 1800 depicts simulation results of an effect of the phase jump for a target speed of 50 meter/second (m/s).

In some demonstrative aspects, as shown in FIG. 18, there may be an SNR loss of up to 1.5 dB caused by the phase difference PhaseDiff, e.g., either an increase or a decrease of the SNR loss by up to 1.5 dB.

In some demonstrative aspects, as shown in FIG. 18, on average, the SNR loss may have a neglectable effect.

Figure 19:
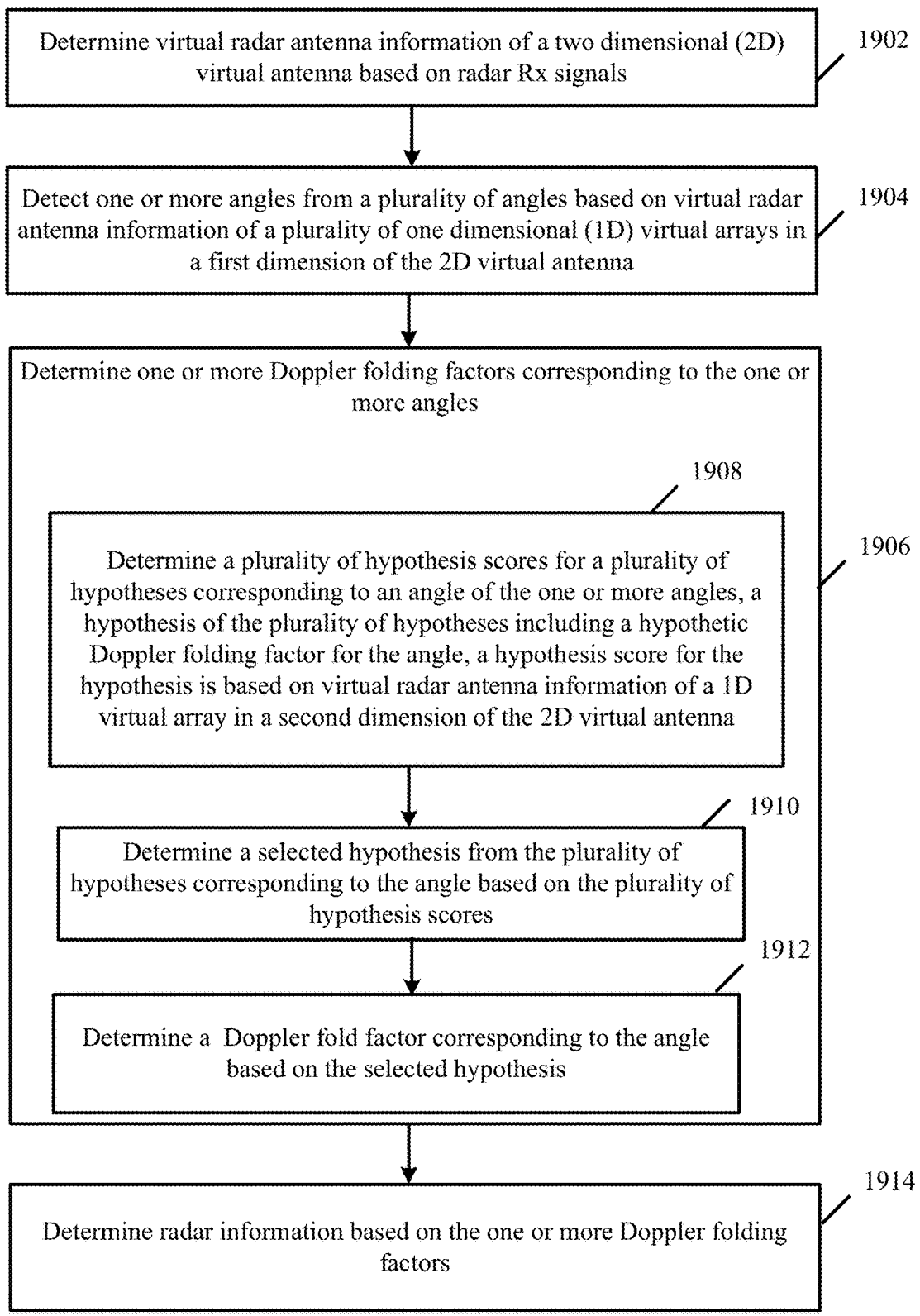
FIG. 19 is a schematic flow-chart illustration of a method of processing radar information, in accordance with some demonstrative aspects.

Reference is made to FIG. 19, which schematically illustrates a method of processing radar information, in accordance with some demonstrative aspects. For example, one or more of the operations of the method of FIG. 19 may be performed by one or more elements of a system, for example, a vehicle, e.g., vehicle 100 (FIG. 1), a radar device, e.g., radar device 101 (FIG. 1), a controller, e.g., controller 1050 (FIG. 10), and/or a processor, e.g., radar processor 834 (FIG. 8) and/or processor 836 (FIG. 8).

As indicated at block 1902, the method may include determining virtual radar antenna information of a 2D virtual antenna based on radar Rx signals. For example, radar processor 834 (FIG. 8) may be configured to determine the virtual radar antenna information of the 2D virtual antenna based on the radar Rx signals represented by radar Rx data 811 (FIG. 8), e.g., as described above.

As indicated at block 1904, the method may include detecting one or more angles from a plurality of angles, for example, based on virtual radar antenna information of a plurality of 1D virtual arrays in a first dimension of the 2D virtual antenna. For example, radar processor 834 (FIG. 8) may be configured to detect the one or more angles from the plurality of angles, for example, based on the virtual radar antenna information of the plurality of 1D virtual arrays in the first dimension of the 2D virtual antenna, e.g., as described above.

As indicated at block 1906, the method may include determining one or more Doppler folding factors corresponding to the one or more angles. For example, radar processor 834 (FIG. 8) may be configured to determine the one or more Doppler folding factors corresponding to the one or more angles, e.g., as described above.

As indicated at block 1908, determining the one or more Doppler folding factors may include determining a plurality of hypothesis scores for a plurality of hypotheses corresponding to an angle of the one or more angles, a hypothesis of the plurality of hypotheses including a hypothetic Doppler folding factor for the angle, wherein a hypothesis score for the hypothesis may be based on virtual radar antenna information of a 1D virtual array in a second dimension of the 2D virtual antenna. For example, radar processor 834 (FIG. 8) may be configured to determine the plurality of hypothesis scores for the plurality of hypotheses corresponding to the angle of the one or more angles, e.g., as described above.

As indicated at block 1910, determining the one or more Doppler folding factors may include determining a selected hypothesis from the plurality of hypotheses corresponding to the angle, for example, based on the plurality of hypothesis score. For example, radar processor 834 (FIG. 8) may be configured to determine the selected hypothesis from the plurality of hypotheses corresponding to the angle, for example, based on the plurality of hypothesis score, e.g., as described above.

As indicated at block 1912, determining the one or more Doppler folding factors may include determining a Doppler fold factor corresponding to the angle based on the selected hypothesis. For example, radar processor 834 (FIG. 8) may be configured to determine the Doppler fold factor corresponding to the angle, for example, based on the selected hypothesis, e.g., as described above.

As indicated at block 1914, the method may include determining radar information based on the one or more Doppler folding factors. For example, radar processor 834 (FIG. 8) may be configured to determine radar information 813 (FIG. 1) based on the one or more Doppler folding factors, e.g., as described above.

Figure 20:
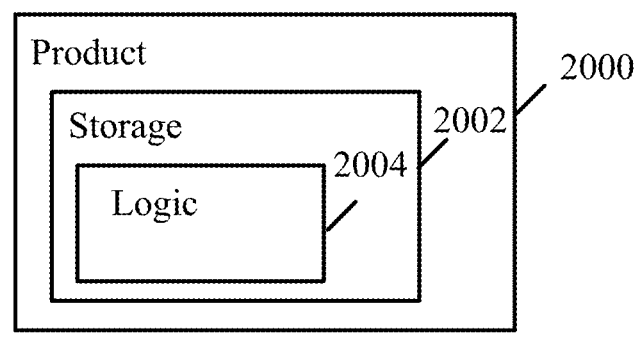
FIG. 20 is a schematic illustration of a product of manufacture, in accordance with some demonstrative aspects.

Reference is made to FIG. 20, which schematically illustrates a product of manufacture 2000, in accordance with some demonstrative aspects. Product 2000 may include one or more tangible computer-readable ("machine-readable") non-transitory storage media 2002, which may include computer-executable instructions, e.g., implemented by logic 2004. The computer-executable instructions, e.g., implemented by logic 2004, may be operable to, when executed by at least one computer processor, enable the at least one computer processor to implement one or more operations at a vehicle, e.g., vehicle 100 (FIG. 1), a radar device, e.g., radar device 101 (FIG. 1), a controller, e.g., controller 1050 (FIG. 10), and/or a processor, e.g., radar processor 834 (FIG. 8) and/or processor 836 (FIG. 8); to cause a vehicle, e.g., vehicle 100 (FIG. 1), a radar device, e.g., radar device 101 (FIG. 1), a controller, e.g., controller 1050 (FIG. 10), and/or a processor, e.g., radar processor 834 (FIG. 8) and/or processor 836 (FIG. 8), to perform, trigger and/or implement one or more operations and/or functionalities; and/or to perform, trigger and/or implement one or more operations and/or functionalities described with reference to one or more of the FIGS. 1-19, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 2000 and/or storage media 2002 may include one or more types of computer-readable storage media capable of storing data, including volatile memory, non-volatile memory, removable or non-removable memory, erasable or non-erasable memory, writeable or re-writeable memory, and the like. For example, storage media 2002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 2004 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 2004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising a radar antenna comprising a Transmit (Tx) antenna array configured to transmit a plurality of Tx radar signals; and a Receive (Rx) antenna array configured to receive a plurality of Rx radar signals based on the plurality of Tx radar signals, the Rx antenna array is orthogonal to the Tx antenna array, wherein a first array of the Tx antenna array or the Rx antenna array comprises a first sub-array and a second sub-array parallel to the first sub-array, wherein a sub-array spacing between the first sub-array and the second sub-array is shorter than a length of a second array of the Tx antenna array or the Rx antenna array.

Example 2 includes the subject matter of Example 1, and optionally, wherein at least one sub-array of the first sub-array or the second sub-array comprises a staggered arrangement of a plurality of one-dimensional (1D) arrays, the plurality of 1D arrays comprising a first 1D array comprising a first plurality of antenna elements, and a second 1D array comprising a second plurality of antenna elements staggered relative to the first plurality of antenna elements.

Example 3 includes the subject matter of Example 2, and optionally, wherein a 1D-array-spacing between a beginning of the first 1D array and a beginning of the second 1D array is shorter than a length of an antenna element of the first 1D array, wherein the 1D-array-spacing and the length of the antenna element are defined along an axis parallel to the first 1D array.

Example 4 includes the subject matter of Example 2 or 3, and optionally, wherein a 1D-array-spacing between a beginning of the first 1D array and a beginning of the second 1D array is half of a length of an antenna element of the first 1D array, wherein the 1D-array-spacing and the length of the antenna element are defined along an axis parallel to the first 1D array.

Example 5 includes the subject matter of any one of Examples 2-4, and optionally, wherein a length of an antenna element of the first 1D array is equal to a wavelength of the plurality of Tx radar signals, and wherein a 1D-array-spacing between a beginning of the first 1D array and a beginning of the second 1D array is equal to half of the wavelength of the plurality of Tx radar signals, wherein the 1D-array-spacing and the length of the antenna element are defined along an axis parallel to the first 1D array.

Example 6 includes the subject matter of any one of Examples 2-5, and optionally, wherein a width of an antenna element of the first 1D array, is equal to a length of an antenna element of the second array, wherein the width of the antenna element of the first 1D array and the length of the antenna element of the second array are defined along an axis parallel to the second array.

Example 7 includes the subject matter of any one of Examples 2-6, and optionally, wherein a width of an antenna element of the first 1D array is equal to half a wavelength of the plurality of Tx radar signals, and wherein a length of an antenna element of the second array is equal to half the wavelength of the plurality of Tx radar signals, wherein the width of the antenna element of the first 1D array and the length of the antenna element of the second array are defined along an axis parallel to the second array.

Example 8 includes the subject matter of any one of Examples 2-7, and optionally, wherein the second array comprises a third plurality of antenna elements, wherein centers of the plurality of 1D arrays are aligned with centers of respective antenna elements of the third plurality of antenna elements of the second array.

Example 9 includes the subject matter of any one of Examples 2-8, and optionally, wherein a distance between a center of a first antenna element of the first 1D array and a center of a second antenna element of the first 1D array, which is adjacent to the first antenna element, is not greater than a wavelength of the plurality of Tx radar signals.

Example 10 includes the subject matter of any one of Examples 1-9, and optionally, wherein a first distance between an antenna element of the first sub-array and a first antenna element of the second array is equal to a second distance between an antenna element of the second sub-array and a second antenna element of the second array, wherein the first antenna element of the second array is above the antenna element of the second sub-array, and the second antenna element of the second array is above the antenna element of the first sub-array.

Example 11 includes the subject matter of any one of Examples 1-10, and optionally, wherein the second array comprises a 1D array comprising a plurality of antenna elements having a same length along an axis parallel to the second array.

Example 12 includes the subject matter of any one of Examples 1-11, and optionally, wherein a length of an antenna element of the second array along an axis parallel to the second array is equal to half a wavelength of the plurality of Tx radar signals.

Example 13 includes the subject matter of any one of Examples 1-12, and optionally, wherein a distance between a center of a first antenna element of the second array and a center of a second antenna element of the second array, which is adjacent to the first antenna element, is equal to half a wavelength of the plurality of Tx radar signals.

Example 14 includes the subject matter of any one of Examples 1-13, and optionally, wherein the first sub-array comprises a first plurality of 1D arrays, and the second sub-array comprises a second plurality of 1D arrays.

Example 15 includes the subject matter of any one of Examples 1-14, and optionally, wherein the first sub-array is identical to the second sub-array.

Example 16 includes the subject matter of any one of Examples 1-15, and optionally, wherein the first array comprises the Tx antenna array, and the second array comprises the Rx antenna array.

Example 17 includes the subject matter of any one of Examples 1-15, and optionally, wherein the first array comprises the Rx antenna array, and the second array comprises the Tx antenna array.

Example 18 includes the subject matter of any one of Examples 1-17, and optionally, comprising a controller configured to control the radar antenna to transmit the plurality of Tx radar signals.

Example 19 includes the subject matter of Example 18, and optionally, wherein the controller is configured to control the Tx antenna array to transmit a sequence of Tx radar signals, the sequence of Tx radar signals comprising a first Tx radar signal via a first antenna element of the first sub-array, and a second Tx radar signal via a second antenna element of the second sub-array, the second Tx radar signal is consecutive to the first Tx radar signal in the sequence of Tx radar signals.

Example 20 includes the subject matter of Example 19, and optionally, wherein the sequence of Tx radar signals comprises a third Tx radar signal via a third antenna element of the first sub-array, and a fourth Tx radar signal via a fourth antenna element of the second sub-array, the fourth Tx radar signal is consecutive to the third Tx radar signal in the sequence of Tx radar signals.

Example 21 includes the subject matter of any one of Examples 18-20, and optionally, wherein the controller is configured to control the Tx antenna array to transmit a plurality of pairs of Tx radar signals, a pair of Tx radar signals comprising a first Tx radar signal via a first antenna element of the first sub-array, and a second Tx radar signal via a second antenna element of the second sub-array.

Example 22 includes the subject matter of Example 21, and optionally, wherein a relative location of the first antenna element with respect to a center of the first sub-array is identical to a relative location of the second antenna element with respect to a center of the second sub-array.

Example 23 includes the subject matter of any one of Examples 18-22, and optionally, wherein the controller is configured to control the Tx antenna array to transmit a first Tx radar signal via a first antenna element of the first sub-array, and to transmit a second Tx radar signal via a second antenna element of the second sub-array; determine a first weighted phase by applying a first weight to a phase of a first Rx radar signal based on the first Tx radar signal; determine a second weighted phase by applying a second weight to a phase of a second Rx radar signal based on the second Tx radar signal; and determine, based on the first weighted phase and the second weighted phase, a phase overlap between the first phase of the first radar Rx signal and the second phase of the second radar Rx signal.

Example 24 includes the subject matter of any one of Examples 1-23, and optionally, comprising a processor configured to generate radar information based on the plurality of Rx radar signals.

Example 25 includes the subject matter of Example 24, and optionally, wherein the processor is configured to determine virtual radar antenna information of a two dimensional (2D) virtual antenna based on the radar Rx signals; detect one or more angles from a plurality of angles based on virtual radar antenna information of a plurality of one dimensional (1D) virtual arrays in a first dimension of the 2D virtual antenna; determine one or more Doppler folding factors corresponding to the one or more angles, wherein determining a Doppler folding factor corresponding to an angle of the one or more angles comprises determining a plurality of hypothesis scores for a plurality of hypotheses corresponding to the angle, a hypothesis of the plurality of hypotheses comprising a hypothetic Doppler folding factor for the angle, a hypothesis score for the hypothesis is based on virtual radar antenna information of a 1D virtual array in a second dimension of the 2D virtual antenna; determining a selected hypothesis from the plurality of hypotheses corresponding to the angle based on the plurality of hypothesis scores; and determining the Doppler folding factor corresponding to the angle based on the selected hypothesis; and determine the radar information based on the one or more Doppler folding factors.

Example 26 includes the subject matter of Example 25, and optionally, wherein the processor is configured to determine an energy vector comprising a plurality of energy values corresponding to the plurality of angles based on the plurality of 1D virtual arrays in the first dimension of the 2D virtual antenna; and detect the one or more angles from the plurality of angles based on an energy criterion corresponding to the plurality of energy values.

Example 27 includes the subject matter of Example 25 or 26, and optionally wherein the processor is configured to determine the hypothesis score for to the hypothesis comprising the hypothetic Doppler folding factor for the angle by determining an energy spectrum based on the hypothetic Doppler folding factor for the angle and the virtual radar antenna information of the 1D virtual array in the second dimension of the 2D virtual antenna; and determining the hypothesis score corresponding to the hypothesis based on a peak-to-average score for the energy spectrum and a Root Mean Square (RMS) bandwidth score for the energy spectrum.

Example 28 includes the subject matter of any one of Examples 24-27, and optionally, comprising a vehicle, the vehicle comprising a system controller to control one or more systems of the vehicle based on the radar information.

Example 29 includes an apparatus comprising means for executing any of the described operations of one or more of Examples 1-28.

Example 30 includes a machine-readable medium that stores instructions for execution by a processor to perform any of the described operations of one or more of Examples 1-28.

Example 31 includes an apparatus comprising a memory; and processing circuitry configured to perform any of the described operations of one or more of Examples 1-28.

Example 32 includes a method including any of the described operations of one or more of Examples 1-28.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a radar antenna comprising:
      a Transmit (Tx) antenna array configured to transmit a plurality of Tx radar signals; and
      a Receive (Rx) antenna array configured to receive a plurality of Rx radar signals based on the plurality of Tx radar signals, the Rx antenna array is orthogonal to the Tx antenna array,
   wherein a first array of the Tx antenna array or the Rx antenna array comprises a first sub-array and a second sub-array parallel to the first sub-array, wherein a sub-array spacing between the first sub-array and the second sub-array is shorter than a length of a second array of the Tx antenna array or the Rx antenna array,
   wherein the second array comprises a row of antenna elements,
   wherein the first sub-array comprises a first column of antenna elements under a first antenna element of the row of antenna elements, and a second column of antenna elements under a second antenna element of the row of antenna elements, the second column of antenna elements staggered relative to the first column of antenna elements,
   wherein the second sub-array comprises a third column of antenna elements under a third antenna element of the row of antenna elements, and a fourth column of antenna elements under a fourth antenna element of the row of antenna elements, the fourth column of antenna elements staggered relative to the third column of antenna elements.

2. The apparatus of claim 1, wherein a stagger-spacing between a beginning of the first column of antenna elements and a beginning of the second column of antenna elements is shorter than an antenna-element length of an antenna element of the first column of antenna elements, wherein the stagger-spacing and the antenna-element length are defined along an axis parallel to the first column of antenna elements.

3. The apparatus of claim 1, wherein a stagger-spacing between a beginning of the first column of antenna elements and a beginning of the second column of antenna elements is half of an antenna-element length of an antenna element of the first column of antenna elements, wherein the stagger-spacing and the antenna-element length are defined along an axis parallel to the first column of antenna elements.

4. The apparatus of claim 1, wherein an antenna-element length of an antenna element of the first column of antenna elements is equal to a wavelength of the plurality of Tx radar signals, and wherein a stagger-spacing between a beginning of the first column of antenna elements and a beginning of the second column of antenna elements is equal to half of the wavelength of the plurality of Tx radar signals, wherein the stagger-spacing and the antenna-element length are defined along an axis parallel to the first column of antenna elements.

5. The apparatus of claim 1, wherein an antenna-element width of an antenna element of the first column of antenna elements, is equal to an antenna-element length of an antenna element of the row of antenna elements, wherein the antenna-element width and the antenna element length are defined along an axis parallel to the row of antenna elements.

6. The apparatus of claim 1, wherein centers of the first, second, third, and fourth columns of antenna elements are aligned with centers of the first, second, third, and fourth antenna elements, respectively.

7. The apparatus of claim 1, wherein a distance between a center of a first antenna element of the first column of antenna elements and a center of a second antenna element of the first column of antenna elements, which is adjacent to the first antenna element of the first column of antenna elements, is not greater than a wavelength of the plurality of Tx radar signals.

8. The apparatus of claim 1, wherein a first distance between an antenna element of the first column of antenna elements and the first antenna element of the row of antenna elements is equal to a second distance between an antenna element of the third column of antenna elements and the third antenna element of the row of antenna elements.

9. The apparatus of claim 1, wherein the row of antenna elements comprises a plurality of antenna elements having a same length along an axis parallel to the row of antenna elements.

10. The apparatus of claim 1, wherein the first array comprises the Tx antenna array, and the second array comprises the Rx antenna array.

11. The apparatus of claim 1, wherein the first array comprises the Rx antenna array, and the second array comprises the Tx antenna array.

12. The apparatus of claim 1 comprising a controller configured to control the radar antenna to transmit the plurality of Tx radar signals.

13. The apparatus of claim 12, wherein the controller is configured to control the Tx antenna array to transmit a sequence of Tx radar signals, the sequence of Tx radar signals comprising a first Tx radar signal via a first antenna element of the first sub-array, and a second Tx radar signal via a second antenna element of the second sub-array, the second Tx radar signal is consecutive to the first Tx radar signal in the sequence of Tx radar signals.

14. The apparatus of claim 12, wherein the controller is configured to control the Tx antenna array to transmit a plurality of pairs of Tx radar signals, a pair of Tx radar signals comprising a first Tx radar signal via a first antenna element of the first sub-array, and a second Tx radar signal via a second antenna element of the second sub-array.

15. The apparatus of claim 14, wherein a relative location of the first antenna element with respect to a center of the first sub-array is identical to a relative location of the second antenna element with respect to a center of the second sub-array.

16. The apparatus of claim 12, wherein the controller is configured to:
control the Tx antenna array to transmit a first Tx radar signal via a first antenna element of the first sub-array, and to transmit a second Tx radar signal via a second antenna element of the second sub-array;
determine a first weighted phase by applying a first weight to a phase of a first Rx radar signal based on the first Tx radar signal;
determine a second weighted phase by applying a second weight to a phase of a second Rx radar signal based on the second Tx radar signal; and
determine, based on the first weighted phase and the second weighted phase, a phase overlap between the first phase of the first radar Rx signal and the second phase of the second radar Rx signal.

17. The apparatus of claim 1 comprising a processor configured to generate radar information based on the plurality of Rx radar signals.

18. The apparatus of claim 17, wherein the processor is configured to:
determine virtual radar antenna information of a two dimensional (2D) virtual antenna based on the radar Rx signals;
detect one or more angles from a plurality of angles based on virtual radar antenna information of a plurality of one dimensional (1D) virtual arrays in a first dimension of the 2D virtual antenna;
determine one or more Doppler folding factors corresponding to the one or more angles, wherein determining a Doppler folding factor corresponding to an angle of the one or more angles comprises:
determining a plurality of hypothesis scores for a plurality of hypotheses corresponding to the angle, a hypothesis of the plurality of hypotheses comprising a hypothetic Doppler folding factor for the angle, a hypothesis score for the hypothesis is based on virtual radar antenna information of a 1D virtual array in a second dimension of the 2D virtual antenna;
determining a selected hypothesis from the plurality of hypotheses corresponding to the angle based on the plurality of hypothesis scores; and
determining the Doppler folding factor corresponding to the angle based on the selected hypothesis; and
determine the radar information based on the one or more Doppler folding factors.

19. The apparatus of claim 18, wherein the processor is configured to:
determine an energy vector comprising a plurality of energy values corresponding to the plurality of angles based on the plurality of 1D virtual arrays in the first dimension of the 2D virtual antenna; and
detect the one or more angles from the plurality of angles based on an energy criterion corresponding to the plurality of energy values.

20. The apparatus of claim 18, wherein the processor is configured to determine the hypothesis score for to the hypothesis comprising the hypothetic Doppler folding factor for the angle by:
determining an energy spectrum based on the hypothetic Doppler folding factor for the angle and the virtual radar antenna information of the 1D virtual array in the second dimension of the 2D virtual antenna; and
determining the hypothesis score corresponding to the hypothesis based on a peak-to-average score for the energy spectrum and a Root Mean Square (RMS) bandwidth score for the energy spectrum.

21. A vehicle comprising:
a system controller configured to control one or more vehicular systems of the vehicle based on radar information; and
a radar device configured to provide the radar information to the system controller, the radar device comprising:
a radar antenna comprising:
a Transmit (Tx) antenna array configured to transmit a plurality of Tx radar signals; and
a Receive (Rx) antenna array configured to receive a plurality of Rx radar signals based on the plurality of Tx radar signals, the Rx antenna array is orthogonal to the Tx antenna array,
wherein a first array of the Tx antenna array or the Rx antenna array comprises a first sub-array and a second sub-array parallel to the first sub-array, wherein a sub-array spacing between the first sub-array and the second sub-array is shorter than a length of a second array of the Tx antenna array or the Rx antenna array,
wherein the second array comprises a row of antenna elements,
wherein the first sub-array comprises a first column of antenna elements under a first antenna element of the row of antenna elements, and a second column of antenna elements under a second antenna element of the row of antenna elements, the second column of antenna elements staggered relative to the first column of antenna elements,
wherein the second sub-array comprises a third column of antenna elements under a third antenna element of the row of antenna elements, and a fourth column of antenna elements under a fourth antenna element of the row of antenna elements, the fourth column of antenna elements staggered relative to the third column of antenna elements; and
a processor configured to generate the radar information based on input radar data, the input radar data based on the Rx radar signals.

22. The vehicle of claim 21, wherein a stagger-spacing between a beginning of the first column of antenna elements and a beginning of the second column of antenna elements is shorter than an antenna-element length of an antenna element of the first column of antenna elements, wherein the stagger-spacing and the antenna-element length are defined along an axis parallel to the first column of antenna element.

23. The vehicle of claim 21, wherein the processor is configured to:
- determine virtual radar antenna information of a two dimensional (2D) virtual antenna based on the radar Rx signals;
- detect one or more angles from a plurality of angles based on virtual radar antenna information of a plurality of one dimensional (1D) virtual arrays in a first dimension of the 2D virtual antenna;
- determine one or more Doppler folding factors corresponding to the one or more angles, wherein determining a Doppler folding factor corresponding to an angle of the one or more angles comprises:
  - determining a plurality of hypothesis scores for a plurality of hypotheses corresponding to the angle, a hypothesis of the plurality of hypotheses comprising a hypothetic Doppler folding factor for the angle, a hypothesis score for the hypothesis is based on virtual radar antenna information of a 1D virtual array in a second dimension of the 2D virtual antenna;
  - determining a selected hypothesis from the plurality of hypotheses corresponding to the angle based on the plurality of hypothesis scores; and
  - determining the Doppler folding factor corresponding to the angle based on the selected hypothesis; and
- determine the radar information based on the one or more Doppler folding factors.

* * * * *